(12) United States Patent
Sawai et al.

(10) Patent No.: US 8,800,980 B2
(45) Date of Patent: Aug. 12, 2014

(54) SPRING STRUCTURE

(75) Inventors: Seiji Sawai, Hamamatsu (JP); Yutaka Yamazaki, Kakegawa (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 311 days.

(21) Appl. No.: 13/131,222

(22) PCT Filed: Nov. 25, 2009

(86) PCT No.: PCT/JP2009/070210
§ 371 (c)(1),
(2), (4) Date: May 25, 2011

(87) PCT Pub. No.: WO2010/061958
PCT Pub. Date: Jun. 3, 2010

(65) Prior Publication Data
US 2011/0233836 A1 Sep. 29, 2011

(30) Foreign Application Priority Data
Nov. 25, 2008 (JP) .................................. 2008-300117

(51) Int. Cl.
| F16F 3/04 | (2006.01) |
| F16F 9/32 | (2006.01) |
| F16F 1/12 | (2006.01) |
| B60G 11/14 | (2006.01) |
| B60G 15/06 | (2006.01) |

(52) U.S. Cl.
CPC ... *F16F 3/04* (2013.01); *F16F 1/12* (2013.01); *B60G 2204/124* (2013.01); *B60G 2202/12* (2013.01); *B60G 11/14* (2013.01); *B60G 15/065* (2013.01); *B60G 2206/42* (2014.01)

USPC ...... 267/166; 267/131; 267/140.13; 267/225; 267/291

(58) Field of Classification Search
USPC .............. 267/166, 166.1, 167, 170, 174, 179, 267/140.12, 140.13, 141.1, 141.2, 141.3, 267/141.4, 225, 291, 131
IPC .................................................. F16F 9/32,3/04
See application file for complete search history.

(56) References Cited

U.S. PATENT DOCUMENTS 2,695,169 A * 11/1954 Keysor .......................... 267/166
7,637,792 B1 * 12/2009 Davis et al. ...................... 440/75

(Continued)

FOREIGN PATENT DOCUMENTS

| JP | 1985-86640 U | 6/1985 |
| JP | 178173/1983 U | 6/1985 |

(Continued)

OTHER PUBLICATIONS

Concise Explanation of Relevance of Japanese patent document No. JP1985-86640U (Jun. 14, 1985).

(Continued)

*Primary Examiner* — Anna Momper
*Assistant Examiner* — San Aung
(74) *Attorney, Agent, or Firm* — Rabin & Berdo, P.C.

(57) ABSTRACT

A spring structure includes a clockwise spring and a counterclockwise spring that are coaxially arranged under a state in which a spring seat is interposed between a lower end portion of the clockwise spring and an upper end portion of the counterclockwise spring. An upper end portion of the clockwise spring is supported on an upper spring seat portion, and a lower end portion of the counterclockwise spring is supported on a lower spring seat portion.

13 Claims, 32 Drawing Sheets

(56) References Cited

U.S. PATENT DOCUMENTS

| | | | |
|---|---|---|---|
| 2003/0111782 A1* | 6/2003 | Miyagawa et al. | 267/170 |
| 2004/0115076 A1* | 6/2004 | Lilie et al. | 417/416 |
| 2008/0099968 A1* | 5/2008 | Schroeder | 267/166 |

FOREIGN PATENT DOCUMENTS

| | | | | |
|---|---|---|---|---|
| JP | 1988-45236 U | | 3/1988 | |
| JP | 135661/1986 U | | 3/1988 | |
| JP | 08226481 A | * | 9/1996 | F16F 3/04 |
| JP | 10-026166 A | | 1/1998 | |
| JP | 11129721 A | * | 5/1999 | B60G 15/06 |
| JP | 2001-080336 A | | 3/2001 | |
| JP | 2004-232768 A | | 8/2004 | |

OTHER PUBLICATIONS

Concise Explanation of Relevance of Japanese patent document JP1988-45236U (Mar. 26, 1988).

* cited by examiner

FIG.24
(a)
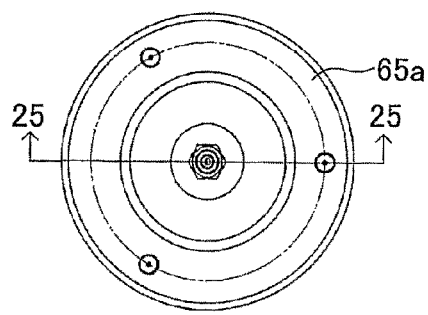
(b)
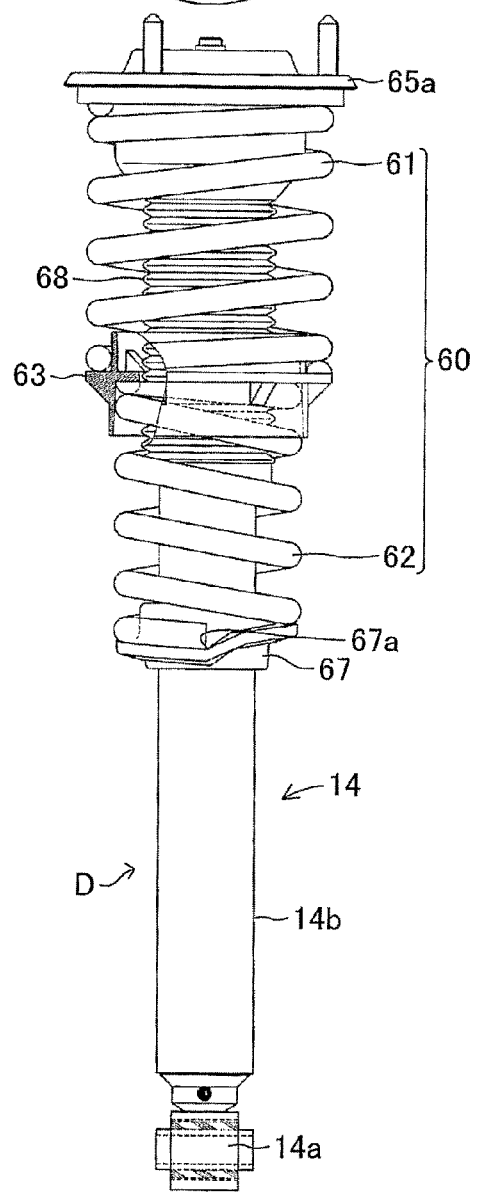

FIG.26
(a) 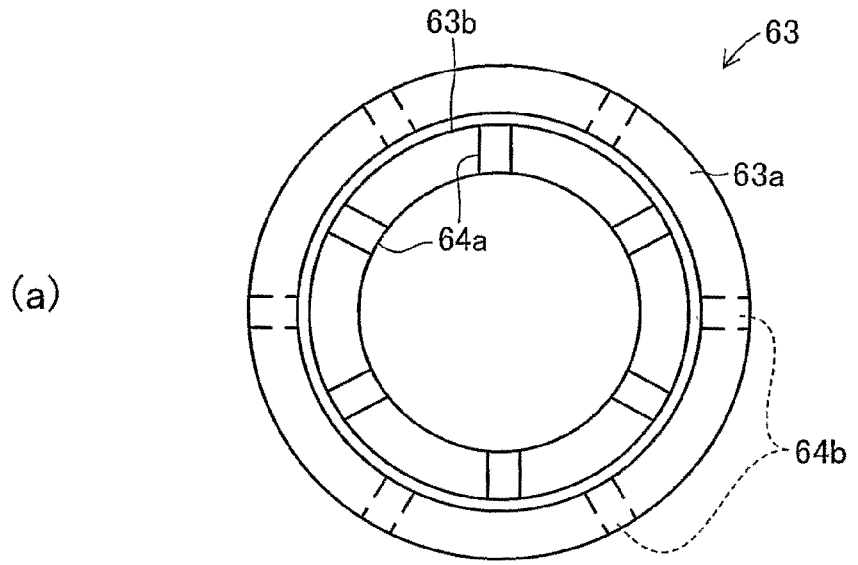
(b) 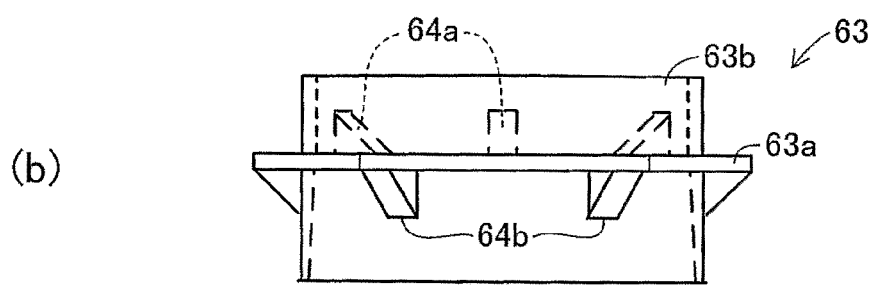
(c) 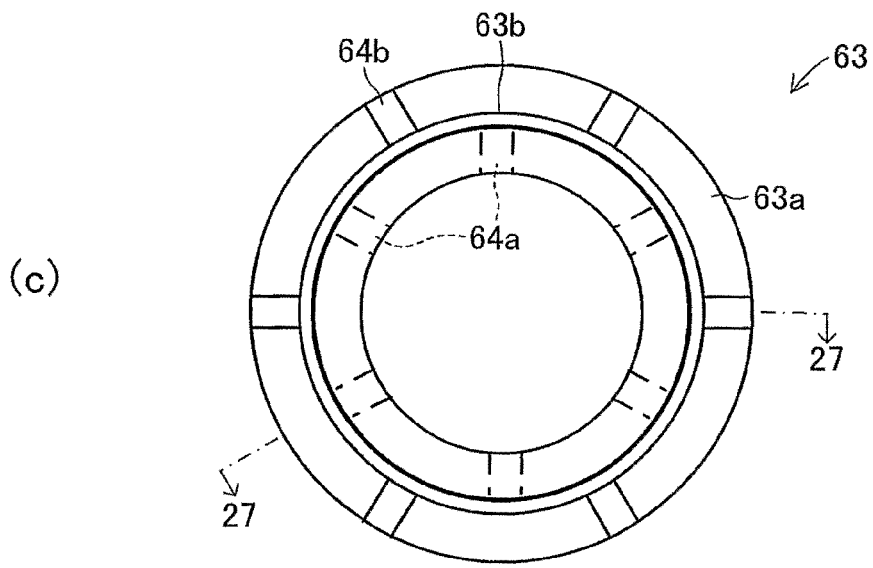

SPRING STRUCTURE

TECHNICAL FIELD

The present invention relates to a spring structure for various use, such as a suspension spring of an automobile, and a spring to be assembled to an intake valve or an exhaust valve of an engine.

BACKGROUND ART

Conventionally, for example, an automobile, a motorcycle, etc. includes a suspension for rockably coupling a wheel and a vehicle body together through an arm, a link, a rod, or the like. The suspension prevents impact and vibration of the wheel from being transmitted to the vehicle body by a damper provided with a spring structure. For example, in a suspension spring (spring structure) disclosed in JP 10-26166 A, two compression coil springs having the same winding direction are arranged in series, and end portions of the compression coil springs, which face to each other, are threadably fixed to and overlap each other. Further, the suspension spring is placed between a body-side tube supported on the vehicle body and an axle-side tube for supporting an axle. Further, the suspension spring is provided with a spring constant adjuster capable of changing an overlapping length of the compression coil springs.

DISCLOSURE OF THE INVENTION

As a result of experiments, the inventors of the present invention found that the above-mentioned conventional suspension spring has the following problems. Specifically, along with expansion and shrinkage of the suspension spring, both ends of the suspension spring are displaced in a twisting direction and receive a torsional force. Consequently, an excess frictional force may be generated at a contacting portion between the one end of the suspension spring and the vehicle body or a contacting portion between the other end of the suspension spring and the wheel side, or the torsional force may act on the suspension, which may have an influence on performance of the damper and the suspension. This similarly applies to a structure where the suspension spring includes a single compression coil spring. Further, springs for various use other than for the suspension spring have similar problems.

The present invention has been made to solve the above-mentioned problems, and has an object to provide a spring structure, which prevents the discrepancy in the twisting direction and the torsional force from occurring at the ends of the compression coil spring along with expansion and shrinkage, and solves a new problem involved with the countermeasures therefor, to thereby improve performance.

In order to achieve the above-mentioned object, a spring structure according to the present invention has the following structural characteristic. Specifically, the spring structure, which is mounted between a base and a moving section which advances to/retreats from the base, includes two compression coil springs different in winding directions, in which one end portions of the two compression coil springs are respectively supported on the base and the moving section directly or through a predetermined member, the other end portions of the two compression coil springs are respectively abutted on front and back surfaces of a spring seat interposed between the other end portions in a state where the other end portions are shifted, with reference to start points of effective windings of the two compression coil springs or end portions of element wires of the two compression coil springs, from each other in position in a circumferential direction around an axis of the two compression coil springs, the two compression coil springs are coaxially arranged through the spring seat, and the spring seat is movable in an axial direction of the two compression coil springs and in the circumferential direction around the axis of the two compression coil springs.

According to the spring structure of the present invention, the two compression coil springs different in the winding directions are arranged in series through the spring seat so as to be coaxially positioned. Further, the spring seat is movable in the axial direction and in the circumferential direction around the axis of the two compression coil springs, and hence the spring seat freely moves on reception of a force from the two compression coil springs. Further, the two compression coil springs have the different winding directions, and hence, at the time of expansion and shrinkage, the end portions toward the spring seat of the two compression coil springs are turned (rotated) in the same direction, to thereby turn the spring seat in the circumferential direction around the axis of the compression coil springs. Thus, a torsional force generated in the two compression coil springs is released through rotation of the spring seat, and discrepancy in the twisting direction and the torsional force do not occur at both ends of the compression coil springs. In this way, it is possible to obtain the spring structure capable of exerting preferable performance.

Further, according to the spring structure of the present invention, the other end portions of the two compression coil springs, which face to each other through the spring seat, are shifted from each other in position in the circumferential direction around the axis of the two compression coil springs with reference to the start points of the effective windings of the two compression coil springs or the end portions of the element wires of the two compression coil springs. Thus, when a large force is applied to the two compression coil springs to shrink the spring structure, the force is equally applied to both sides of an axis of the spring structure, and thus the two compression coil springs are maintained in a straight state as a whole. In this regard, for example, an auxiliary spring, a seat member or the like is provided as the predetermined member between the one end portion of each of the two compression coil springs and the base or the moving section.

Further, the spring structure according to the present invention has another following structural characteristic. Specifically, the shift, provided in the circumferential direction around the axis of the two compression coil springs, between the other end portions of the two compression coil springs abutting on the spring seat is set within a range of 180±45 degrees with reference to the start points of the effective windings or the end portions of the element wires by a degree.

The start point of the effective winding defined in the above structure corresponds to a point at which an end-side portion of each compression coil spring is separated from a member abutted on the end-side portion, or a point at which the effective winding of the compression coil spring starts from the end turn portion of the compression coil spring, that is, a boundary between a contact portion and a non-contact portion each of which is defined between the end-side portion of the compression coil spring and the abutted member, or a boundary between the effective winding and the end turn portion of the compression coil spring. Further, the end portion of the element wire corresponds to a distal end surface or a distal end of the compression coil spring. As described above, the shift, provided in the circumferential direction around the axis of the two compression coil springs, between the other end portions of the two compression coil springs abutting on the spring seat is set with reference to the start points of the effective windings or the end portions of the element wires by a degree, and thus it is possible to precisely set the shift amount of the other end portions. Consequently, the more preferred spring structure can be obtained. The most preferred shift amount in this structure is 180 degrees of the shift between the end portions of the element wires or between the start points of the effective windings in the other end portions of the two compression coil springs, the shift being provided in the circumferential direction around the axis of the compression coil springs.

Further, the spring structure according to the present invention has still another following structural characteristic. Specifically, the both front and back surfaces of the spring seat, on which the other end portions of the two compression coil springs abut, are formed into flat surfaces, and the other end portions of the two compression coil springs which abut on the spring seat are formed into flat surfaces orthogonal to the axis of the two compression coil springs. With this, the two compression coil springs can be arranged in right coaxial manner through the spring seat, and hence performance of the spring structure can be further improved. Further, in this structure, engagement sections, positioning sections, and the like, which are engaged together, can be provided between the end portions of the two compression coil springs and the both front and back surfaces of the spring seat. Thus, the end portions of the compression coil springs can be positioned at appropriate positions of the spring seat.

Further, the spring structure according to the present invention has still another following structural characteristic. Specifically, the spring seat includes: an abutting plate portion on which the other end portions of the two compression coil springs abut; and a coaxially holding portion, which coaxially holds the two compression coil springs, provided to both front and back surfaces of the abutting plate portion.

As the spring seat in this structure, spring seats with various shapes can be used. For example, the spring seat may include an abutting plate portion constituted by an annular or circular plate portion, and a coaxially holding portion constituted by a tubular portion provided at an outer periphery of the abutting plate portion. Alternately, the spring seat may include an abutting plate portion constituted by an annular plate portion, and a coaxially holding portion constituted by a tubular portion provided at an inner circumference of the annular abutting plate portion. Ina case where the coaxially holding portion constituted by the tubular portion is provided at the outer periphery of the annular or circular abutting plate portion, the end portions of the two compression coil springs can be inserted into the tubular portion respectively from above and below the tubular portion, and thus the two compression coil springs can be coaxially holed. Further, the tubular portion can protect the end portions toward the spring seat of the two compression coil springs.

Further, in a case where the coaxially holding portion constituted by the tubular portion is provided at the inner circumference of the annular abutting plate portion, the end portions of the two compression coil springs are positioned at the outer periphery of the tubular portion respectively from above and below the tubular portion, and thus the two compression coil springs can be coaxially held. Further, according to this way, it is possible to prevent extraneous material from being accumulated inside the tubular portion. Because, as described above, the other end portions of the two compression coil springs are shifted in position in the circumferential direction around the axis of the two compression coil springs and the coaxially holding portion is provided to the spring seat, the two compression coil springs can be more reliably held coaxially.

In addition, the spring seat may include the abutting plate portion constituted by an annular plate portion, a tubular portion protruding from an inner circumferential portion of the annular abutting plate portion in one direction, and a tubular portion protruding from an outer peripheral portion of the annular abutting plate portion in the other direction. In this structure, when one end portion of one of the compression coil springs is positioned at an outer periphery of the tubular portion protruding in the one direction, and one end portion of the other one of the compression coil springs is positioned inside the tubular portion protruding in the other direction, it is possible to reliably prevent the end portions toward the spring seat of the two compression coil springs from being displaced from the axial with respect to the abutting plate portion. Note that, the coaxially holding portion provided to the both front and back surfaces of the abutting plate portion according to the present invention may include a coaxially holding portion protruding from an outer peripheral edge portion and an inner circumferential edge portion of the abutting plate portion toward the both front side and back side of the abutting plate portion. Further, the coaxially holding portion may not be tubular. The coaxially holding portion only needs to hold the two compression coil springs coaxially.

Further, the spring structure according to the present invention has still another following structural characteristic. Specifically, the both front and back surfaces of the spring seat, on which the other end portions of the two compression coil springs are disposed, have engaging protrusions formed thereon which allow the end portions of the element wires of the two compression coil springs to abut to the engaging protrusions.

With this, the end portions of the element wires of the compression coil springs abut on the engaging protrusions, and thus the positions of the compression coil springs can be precisely defined with respect to the spring seat.

Further, the spring structure according to the present invention has still another following structural characteristic. Specifically, the other end portions of the two compression coil springs abutting on the spring seat are provided with engaged recesses, and the both front and back surfaces of the spring seat, on which the other end portions of the two compression coil springs abut, have engaging protrusions formed thereon which allow the engaged recesses of the two compression coil springs to be engaged to engaging protrusions.

With this, the engaged recesses of the compression coil springs are engaged on the engaging protrusions, and thus the positions of the compression coil springs can be precisely defined with respect to the spring seat. The end portions in this structure is defined as distal end portions of the compression coil springs and vicinities of the distal end portions, and thus the scope of the end portions include end surfaces of the compression coil springs.

Further, the spring structure according to the present invention has still another following structural characteristic. Specifically, the other end portions of the two compression coil springs abutting on the spring seat have shapes made just by cutting, and the both front and back surfaces of the spring seat, on which the end portions of the two compression coil springs abut, have engagement recesses formed thereon which allow the end portions of the element wires of the two compression coil springs to be engaged to the engagement recesses.

With this, the compression coil springs assembled to the spring structure have the end portions formed into end surfaces having shapes made just by cutting and not provided with processing for forming the end portions into flat surfaces orthogonal to the axial direction. And hence, it is possible to reduce manufacturing cost. Further, the engagement recess in this structure preferably includes a recess having a surface capable of supporting at least part in the end surface of the compression coil spring and the peripheral surface of a vicinity of the end portion of the compression coil spring, to thereby prevent the end portion of the compression coil spring from being misaligned with respect to the spring seat.

In addition, according to the spring structure of the present invention, it is preferred that, portions of the spring seat on which the other end portions of the two compression coil springs abut are respectively provided with recesses shifted in position in the circumferential direction, and the other end portions of the two compression coil springs abutting on the spring seat are positioned in the recesses, respectively. The end portions in this structure are also defined as the distal end portions of the compression coil springs and vicinities of the distal end portions. With this, it is possible to reduce a length of the spring structure in the axial direction.

Further, the spring structure according to the present invention has still another following structural characteristic. Specifically, the two compression coil springs different in the winding directions includes compression coil springs having different diameters. With this, in a case where a space for placing the spring structure is narrow, the compression coil spring with a smaller diameter can be arranged in the narrow space, and thus the spring structure can be mounted.

Further, the spring structure according to the present invention has still another following structural characteristic. Specifically, the two compression coil springs different in the winding directions include compression coil springs having different diameters, and the portions of the spring seat on which the other end portions of the two compression coil springs abut are formed into such shape that the portions of the spring seat are positioned on different levels in the axial direction so that the two compression coil springs partially overlap each other in the axial direction. With this, in a case where a space for placing the spring structure is narrow, a compression coil spring with a smaller diameter can be arranged in the narrow space, and thus the spring structure can be mounted. Further, the length of the spring structure in the axial direction can be reduced, and hence the spring structure can be arranged on a place narrowed in the up-and-down direction.

Further, the spring structure according to the present invention has still another following structural characteristic. Specifically, the two compression coil springs different in the winding directions are substantially same in characteristic shown when the two compression coil springs shrink and defining a torsion angle in the twisting direction with respect to a displacement amount of the spring. With this, when the two compression coil springs expand and shrink simultaneously, the torsion angles caused therein are substantially equal. As a result, the torsional force generated in the two compression coil springs is completely released by turning of the spring seat. Thus, it is possible to completely prevent discrepancy in the twisting direction and the torsional force from occurring at the both ends of the compression coil springs.

Further, the spring structure according to the present invention has still another following structural characteristic. Specifically, a telescopic shaft includes an inner shaft portion which includes a spring seat portion on an outer peripheral portion of the inner shaft portion, and an outer shaft portion which includes a spring seat portion on an outer peripheral portion of the outer shaft portion and is assembled to the inner shaft portion to be movable in the axial direction, and one of the inner shaft portion and the outer shaft portion of the telescopic shaft serves as the base, and the other one of the inner shaft portion and the outer shaft portion serves as the moving section so that the spring structure is disposed between the spring seat portions on the outer periphery of the telescopic shaft.

In this structure, the telescopic shaft may employ a damper for a vehicle, or a mechanism including intake and exhaust valves of an engine and valve guides for slidably supporting the intake and exhaust valves. Further, according to the present invention, an insertion hole may be formed in a center of the spring seat, and the telescopic shaft may pass through the insertion hole of the spring seat.

BRIEF DESCRIPTION OF THE DRAWINGS

FIG. 24 illustrate a spring structure according to a fifth embodiment, in which a part (a) is a plan view and a part (b) is a front view;

FIG. 26 illustrate a spring seat included in the spring structure according to the fifth embodiment, in which a part (a) is a plan view, a part (b) is a front view, and a part (c) is a bottom view;

MODES FOR CARRYING OUT THE INVENTION

Figure 1:
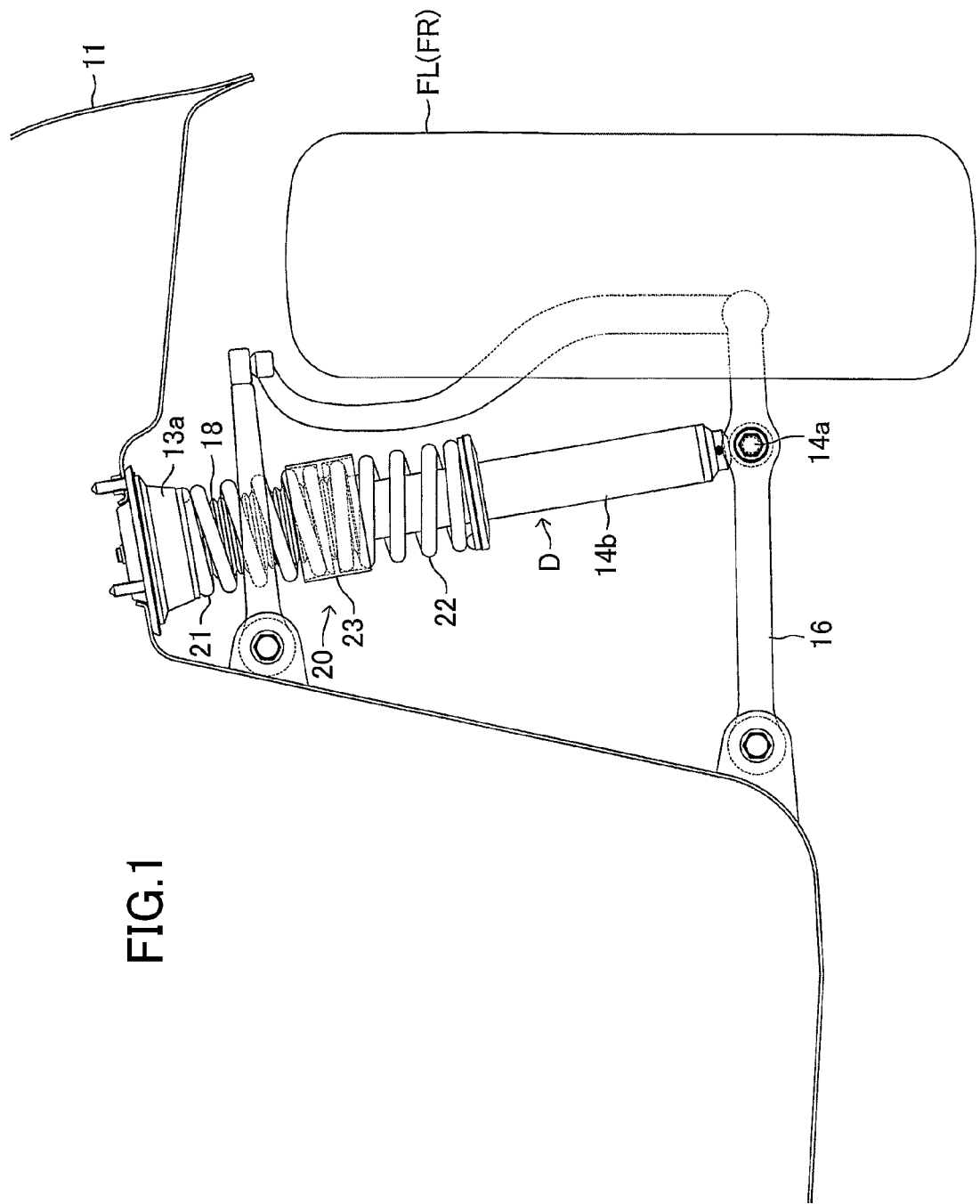
FIG. 1 is a front view illustrating a state in which a spring structure according to a first embodiment is arranged between a vehicle body and a front wheel of an automobile.
Figure 2:
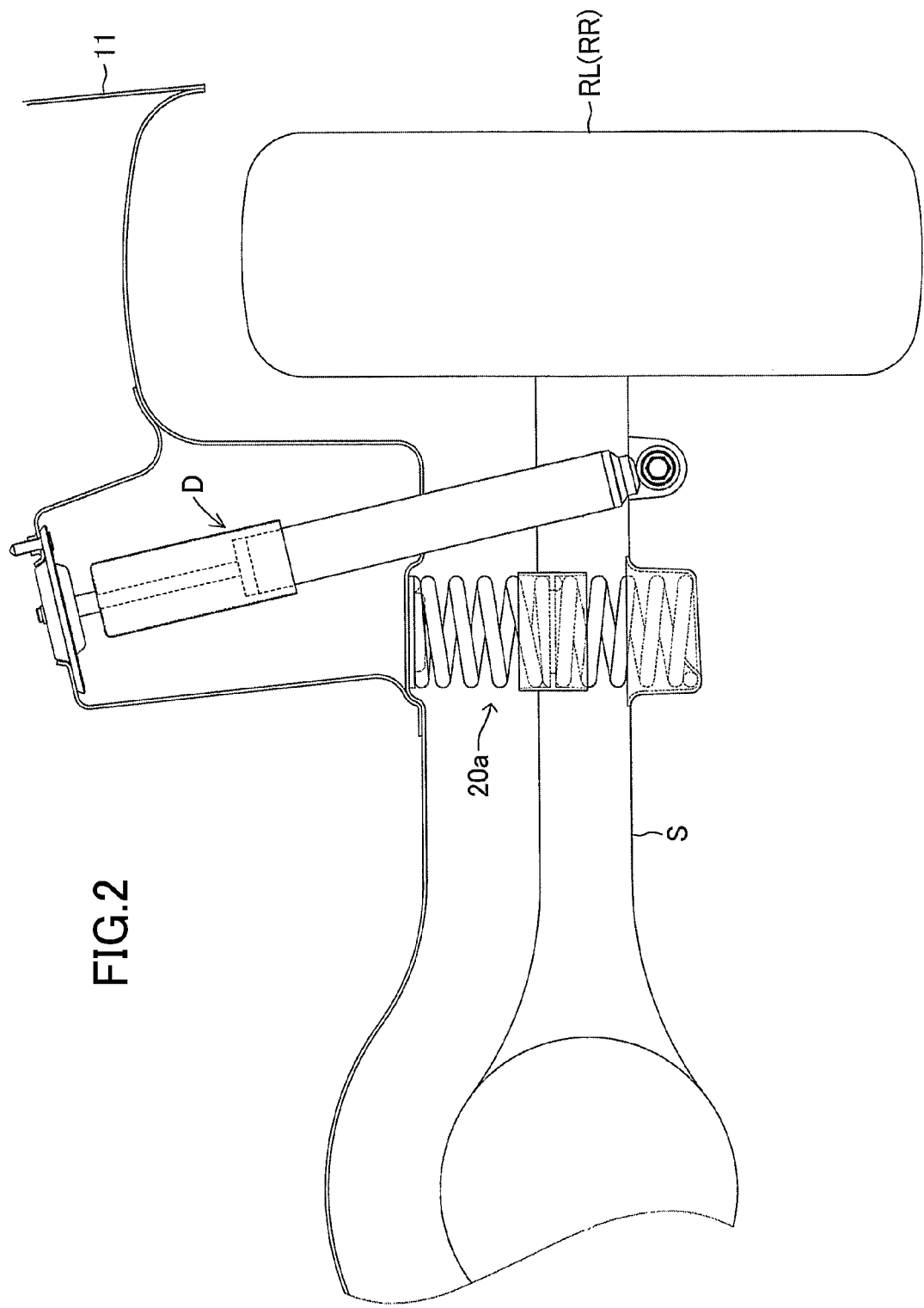
FIG. 2 is a front view illustrating a state in which the spring structure is arranged between the vehicle body and a rear wheel of the automobile.

In the following, a first embodiment according to the present invention is described with reference to the drawings. FIG. 1 illustrates a spring structure 20 according to this embodiment, and FIG. 2 illustrates a spring structure 20a. The spring structure 20 is arranged between the body 11 of an automobile and a front wheel FL arranged on each of a left side and the right side of the front portion of the body 11. The spring structure 20a is arranged between the body 11 of the automobile and a rear wheel RL arranged on each of the left side and the right side of the rear portion of the body 11. Each of the spring structure 20 and the spring structure 20a constitutes a part of a suspension. The suspension prevents impact and vibration from being transmitted to the body 11 from the front wheel FL, the front wheel FR, the rear wheel RL, or the rear wheel RR.

Figure 3:
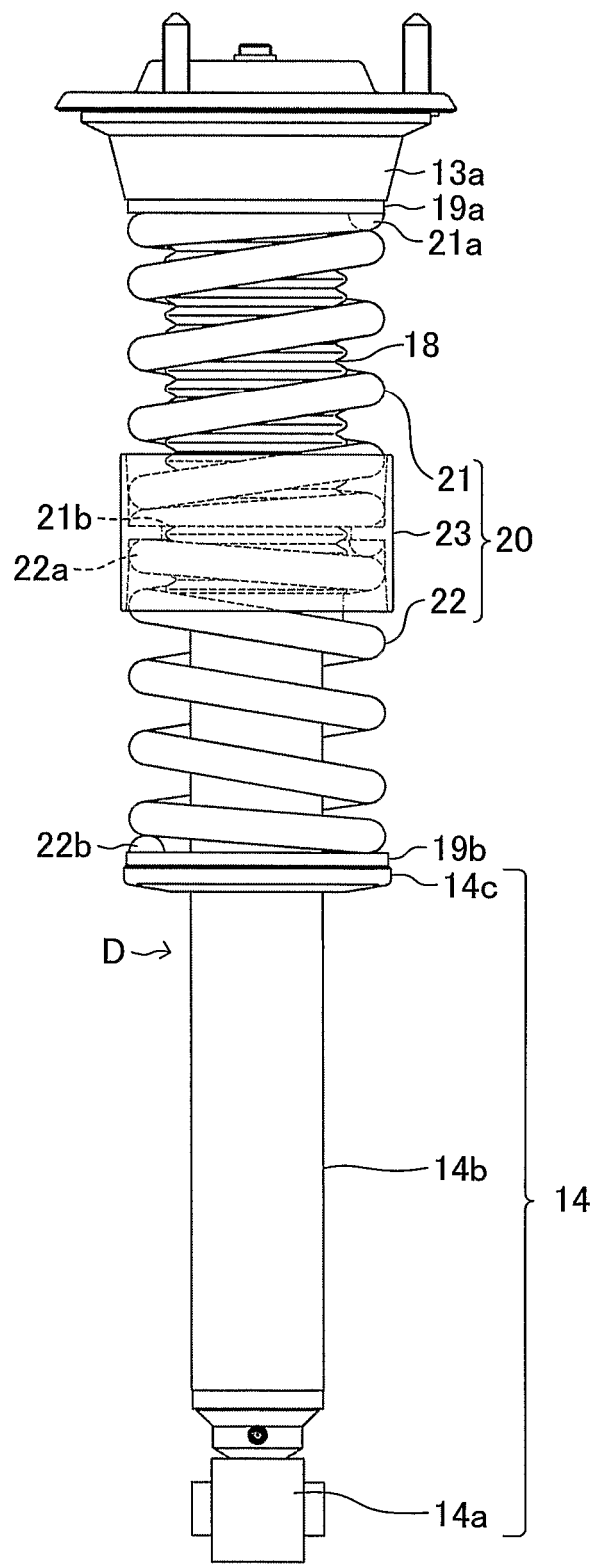
FIG. 3 is a front view of the spring structure according to the first embodiment.

As described in claim 12, a front part of the suspension is provided with a damper D serving as a telescopic shaft of the present invention. The damper D includes an inner shaft portion 13 (see FIG. 4) serving as a base coupled to the body 11, and a tubular outer shaft portion 14 (see FIG. 3 and FIG. 4) serving as a moving section coupled to each of the front wheel FL and the front wheel FR. The spring structure 20 is placed on an outer periphery of the damper D. Alternately, the damper D may be turned upside down, the outer shaft portion 14 as the base may be arranged toward the body 11, and the inner shaft portion 13 as the moving section may be arranged toward the front wheel FL and the front wheel FR. The inner shaft portion 13 includes a fixed portion 13a fixed to the body 11, a piston rod 13b extending downward from a center portion of the fixed portion 13a through a rubber mount 13d, and a piston 13c attached to an outer periphery of a lower end of the piston rod 13b. Further, an upper spring seat portion 15 having an annular shape and a flat surface is formed on a lower surface of a lower portion of the fixed portion 13a, the lower portion having a small diameter. A cylindrical portion 15a for locking protrudes downward from the inner circumferential edge portion of the upper spring seat portion 15, having a short length in the axial direction.

The outer shaft portion 14 includes: a coupling portion 14a coupled to an arm 16 arranged toward the front wheel FL and FR; a cylinder 14b which is formed into a cylindrical body with a closed bottom and has the bottom welded to the coupling portion 14a; a piston rod guide 14d closing an upper end opening of the cylinder 14b and supporting the piston rod 13b so as to allow the piston rod 13b to slide; and a spring seat portion 14c positioned slightly higher than a center in an up-and-down direction on an outer peripheral surface of the cylinder 14b. The spring seat portion 14c includes an annular lower spring seat portion 17 having an upper surface as a flat surface, and a cylindrical portion 17a for locking which extends upward along the cylinder 14b from an inner circumferential edge portion of the lower spring seat portion 17 and has a short length in the axial direction. An inner circumferential surface of the cylindrical portion 17a is fixed to the outer peripheral surface of the cylinder 14b through a lock ring 17b.

The piston 13c of the inner shaft portion 13 is allowed to slide in fluid-tight contact with an inner circumferential surface of the cylinder 14b of the outer shaft portion 14. Further, oil chambers, i.e., two upper and lower chambers defined by the piston 13c are formed inside the cylinder 14b. In addition, the oil chambers are adjacent to a high-pressure gas chamber, and are always under pressure by a free piston. Further, the piston 13c has well-known paired flow passages extending between upper and lower surfaces of the piston 13c. Through the paired flow passages, oil moves between the oil chambers provided above and below the piston 13c, and thus a damping force is generated in the damper D.

Further, an upper end portion of a bellows-shaped cover member 18 formed of an elastic member is fixed to the upper spring seat portion 15 of the inner shaft portion 13, and a lower end portion thereof extends, in a free state, to the vicinity of an upper end portion at the outer periphery of the cylinder 14b. This configuration prevents mud and the like from adhering to the piston rod 13b. In this regard, as described later, a seat 19a is molded integrally with an upper end of the cover member 18 and sandwiched between a clockwise spring 21 and the upper spring seat portion 15.

The spring structure 20 includes the clockwise spring 21 arranged on an upper side between the upper spring seat portion 15 and the lower spring seat portion 17, a counterclockwise spring 22 arranged on a lower side therebetween, and a spring seat 23 arranged between the clockwise spring 21 and the counterclockwise spring 22. Springs having the same diameter, length in the axial direction, spring constant, and the like serve as the clockwise spring 21 and the counterclockwise spring 22. That is, the clockwise spring 21 and the counterclockwise spring 22 have the same configuration except for a difference in winding directions. Therefore, the clockwise spring 21 and the counterclockwise spring 22 have the same characteristic defining a torsion angle in the twisting direction (the characteristic is defined as relation between the torsion angle and the displacement amount).

Further, both end portions of the clockwise spring 21 and both end portions of the counterclockwise spring 22 are processed to be formed into flat surfaces orthogonal to axial direction of the springs. Further, the clockwise spring 21 includes, at both ends thereof, end turn portions 21a, 21b respectively which are wound one turn. The counterclockwise spring 22 includes, at both ends thereof, end turn portions 22a, 22b respectively which are wound one turn. Each of the end turn portions 21a, 21b is defined as a one turn along a line making a loop that starts from the end portion A (see FIG. 4) of the element wire of the spring and then comes back to the end portion A of the element wire to be adjacent to a close contact portion B, and therefore each of the end turn portions 21a, 21b does not function as a spring. The same applies to the end turn portions 22a, 22b. The middle portion between the end turn portions 21a, 21b at the both ends of the spring and the middle portion between the end turn portions 22a, 22b is an effective winding portion functioning as a spring. The start point of the effective winding portion corresponds to the above-mentioned close contact portion B. Hereinafter, the start point of the effective winding is also denoted by "B".

Further, in this embodiment, the clockwise spring 21 are formed such that the start points B of the effective winding on the both end sides of the clockwise spring 21 are shifted by 180 degrees in a circumferential direction around an axis of the clockwise spring 21, and the counterclockwise spring 22 are formed such that the start points B of the effective winding on the both end sides of the counterclockwise spring 22 are shifted by 180 degrees in a circumferential direction around an axis of the counterclockwise spring 22.

Further, the spring seat 23 is formed of a molded body made of a metal material such as aluminum, and is shaped such that a cylindrical tubular portion 23b serving as a coaxially holding portion in the present invention is coupled at an outer periphery of an annular abutting plate portion 23a. The abutting plate portion 23a is formed into an annular flat plate portion which has an inner diameter slightly larger than an outer diameter of the cover member 18 and has an outer diameter equal to or slightly larger than an outer diameter of the clockwise spring 21 and an outer diameter of the counterclockwise spring 22. A flat surface portion at a lower end of the clockwise spring 21 (part of the end turn portion 21b) abuts on an upper surface of the abutting plate portion 23a, and a flat surface portion at an upper end of the counterclockwise spring 22 (part of the end turn portion 22a) abuts on a lower surface of the abutting plate portion 23a.

The abutting plate portion 23a has upper and lower surfaces formed into flat surfaces, and is formed to have a constant thickness. Under a state of being orthogonal to the axial direction of the clockwise spring 21 and the counterclockwise spring 22, the abutting plate portion 23a abuts on the flat surface at the end of the clockwise spring 21, the flat surface at the end of the counterclockwise spring 22, and the end turn portions 21b, 22a respectively corresponding to the flat surfaces at the ends thereof. The tubular portion 23b is arranged such that its axial direction is along the up-and-down direction. Further, the tubular portion 23b is coupled to the abutting plate portion 23a such that the center portion in the up-and-down direction of the inner circumferential surface of the tubular portion 23b surrounds the outer periphery of the abutting plate portion 23a. Further, the lower end portion of the clockwise spring 21 is inserted into an upper interior of the tubular portion 23b, and the upper end portion of the counterclockwise spring 22 is inserted into a lower interior of the tubular portion 23b. Through the spring seat 23, the clockwise spring 21 and the counterclockwise spring 22 are held so as to be coaxial with each other.

It is a first highly important point that the spring seat 23 is sandwiched by the clockwise spring 21 and the counterclockwise spring 22 and is changed in position in accordance with forces applied from the clockwise spring 21 and the counterclockwise spring 22. When the clockwise spring 21 and the counterclockwise spring 22 expand and shrink, the respective springs 21, 22 are twisted in a shrink process such that coils of the springs 21, 22 are loosened, and are twisted in an expansion process such that the coils thereof are fastened. Thus, the end portion toward the spring seat 23 of the clockwise spring 21 and that of the counterclockwise spring 22 have the same rotating (twisting) direction, to thereby turn the spring seat 23 in the circumferential direction around the axis of the spring. Therefore, torsional forces generated in the clockwise spring 21 and the counterclockwise spring 22 are released by the turning of the spring seat 23, and the spring seat 23 moves in the axial direction of the clockwise spring 21 and the counterclockwise spring 22. In this way, it is possible to achieve a first object of preventing occurrence of discrepancy in a twisting direction and generation of the torsional forces at both ends of a compression coil spring due to expansion and shrink.

Further, as described in detail later, it is a second highly important point that the start point B of the effective winding at the lower end of the clockwise spring 21 and the start point B of the effective winding at the upper end of the counterclockwise spring 22 are shifted by 180 degrees in position in the circumferential direction around the axis of the clockwise spring 21 or the counterclockwise spring 22. Note that, in this embodiment, the clockwise spring 21 and the counterclockwise spring 22 are arranged such that the start point B of the effective winding at the upper end of the clockwise spring 21 and the start point B of the effective winding at the lower end of the counterclockwise spring 22 are shifted by 180 degrees in the circumferential direction around the axis of the clockwise spring 21 or the counterclockwise spring 22. However, this point is not essential to the present invention.

As described above, in the first embodiment, the start point B of effective winding at the lower end of the clockwise spring 21 and the start point B of effective winding at the upper end of the counterclockwise spring 22 are shifted by 180 degrees in the circumferential direction around the axis of the spring. With this configuration, when the spring structure 20 shrinks, it is possible to prevent a boundary portion between the clockwise spring 21 and the counterclockwise spring 22 from being displaced together with the spring seat 23 in a direction orthogonal to the axial direction, and to maintain the clockwise spring 21 and the counterclockwise spring 22 in being straight arranged as a whole. Thus, it is possible to achieve a second object that is a new object involved with the first object.

Figure 5:
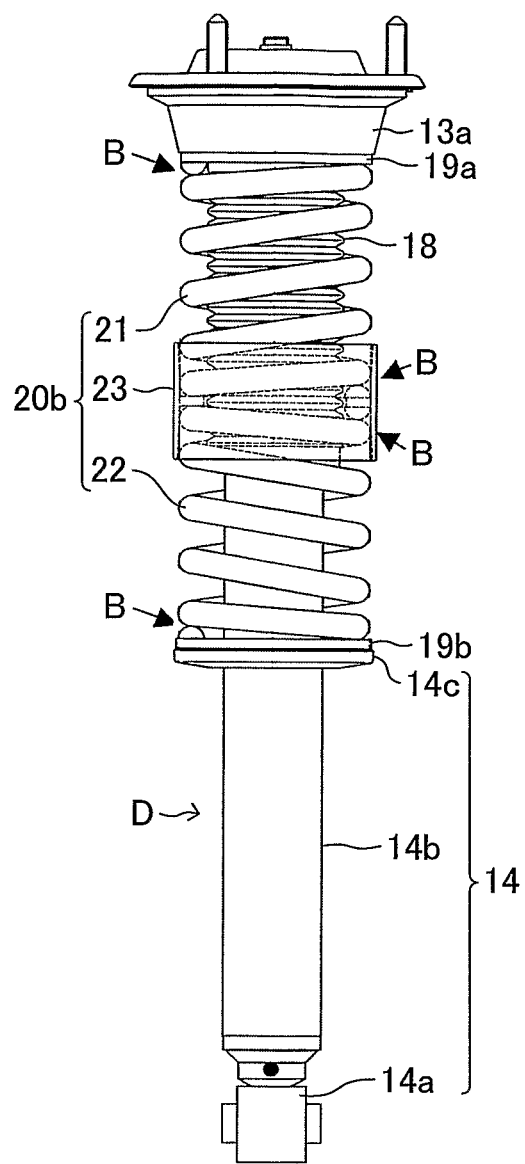
FIG. 5 is a front view illustrating positions of a spring structure according to Comparative Example, at which force is applied.

The above point will be described in detail. The following has been found through experiments. In a structure, as a spring structure 20b according to Comparative Example illustrated in FIG. 5, where the start point B of effective winding at the lower end of the clockwise spring 21 and the start point B of effective winding at the upper end of the counterclockwise spring 22 are positioned at the same positions in the circumferential direction around the axis of the spring, the spring structure 20b, when shrinking, gets into a state illustrated in FIG. 6, to thereby affect the performance thereof. Specifically, black arrows illustrated in FIG. 5 each indicate the position of the start point B of effective winding, and large forces F are applied to the positions when the clockwise spring 21 and the counterclockwise spring 22 shrink.

Figure 6:
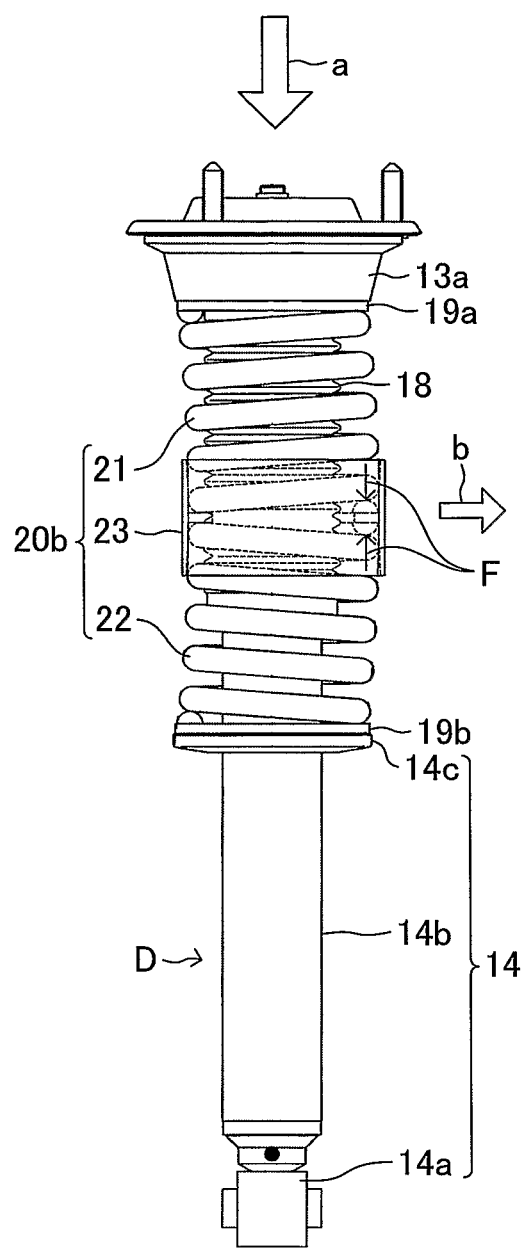
FIG. 6 is a front view illustrating a state in which the spring structure illustrated in FIG. 5 shrinks.

Therefore, when a force is applied in a direction of a white arrow "a" illustrated in FIG. 6 and then the spring structure 20b shrinks, the large forces F are applied to one side relative to the axis of the spring structure 20b, and thus the boundary portion between the clockwise spring 21 and the counterclockwise spring 22 is displaced together with the spring seat 23 in a direction of a white arrow "b", i.e., the direction orthogonal to the axial direction of the spring structure 20b. However, in a structure, as the spring structure 20 illustrated in FIG. 7, where the start point B of effective winding at the lower end of the clockwise spring 21 and the start point B of effective winding at the upper end of the counterclockwise spring 22 are shifted by 180 degrees in the circumferential direction around the axis of the spring, it is possible to prevent occurrence of the discrepancy illustrated in FIG. 6.

Figure 7:
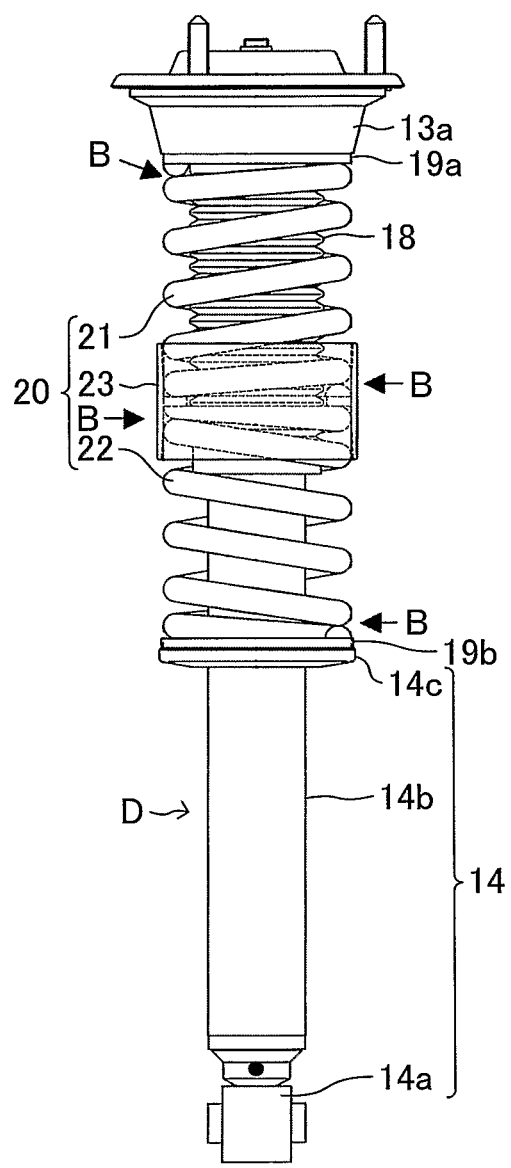
FIG. 7 is a front view illustrating positions of the spring structure according to the first embodiment, at which the force is applied.
Figure 8:
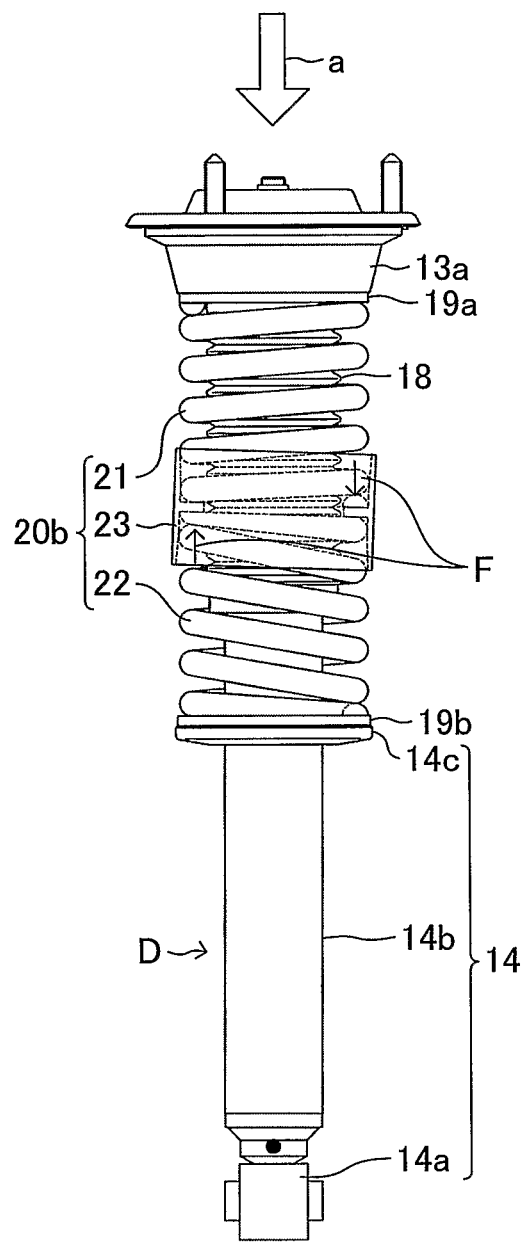
FIG. 8 is a front view illustrating a state in which the spring structure illustrated in FIG. 7 shrinks.

Black arrows illustrated in FIG. 7 also indicate the position of the start point B of effective winding of the clockwise spring 21 and that of the counterclockwise spring 22, respectively. When the clockwise spring 21 and the counterclockwise spring 22 shrink, the large forces F are applied to the positions indicated by the black arrows. When a force is applied in the direction of the white arrow "a" illustrated in FIG. 8 and then the spring structure 20 shrinks, the large forces F are applied to both sides relative to the axis of the spring structure 20b. Consequently, as illustrated in FIG. 8, the spring structure 20 shrinks straight in the axial direction. In this case, only the spring seat 23 is slightly inclined relative to the axial direction of the clockwise spring 21 and the counterclockwise spring 22.

Figure 4:
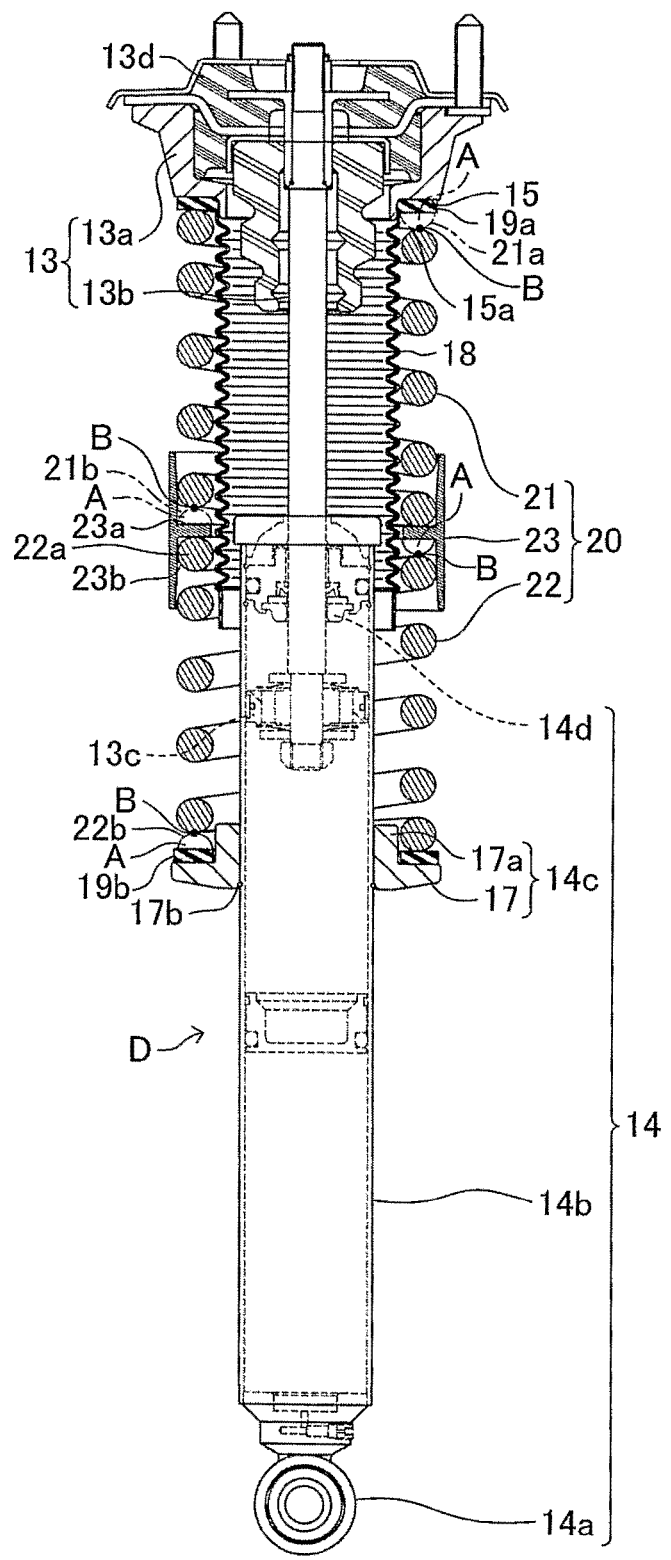
FIG. 4 is a sectional view of the spring structure according to the first embodiment.

Further, as illustrated in FIG. 4, the annular seat 19a molded integrally with the cover member 18 is placed between the upper spring seat portion 15 and the upper end portion of the clockwise spring 21. Further, an annular elastic seat 19b is placed between the lower spring seat portion 17 and the lower end portion of the counterclockwise spring 22. Each of the seat 19a and the elastic seat 19b is a well-known member for preventing self-excited vibration of the spring from being transmitted to the body 11. Alternately, the seat is not limited thereto, and may be placed between the abutting plate portion 23a and the clockwise spring 21 or between the abutting plate portion 23a and the counterclockwise spring 22.

According to the automobile provided with the spring structure 20 as described above, even when the front wheels FL, FR and the like vibrate or receive impact due to a reaction force from a road surface during vehicle running, the vibration and impact are prevented from being transmitted to the vehicle body owing to action of the spring structure 20. Further, the damping force is generated owing to actuation of the damper D, and thereby the running state of the vehicle can be maintained in a preferable state. Further, in the spring structure 20 according to this embodiment, the clockwise spring 21 and the counterclockwise spring 22 different in the winding directions are coaxially arranged through the spring seat 23. The spring seat 23 is not fixed, but supported only by being sandwiched between the clockwise spring 21 and the counterclockwise spring 22, and hence the spring seat 23 is movable in the axial direction of the spring structure 20 and a circumferential direction around the axis of the spring structure.

Therefore, when the clockwise spring 21 and the counterclockwise spring 22 expand and shrink, the end portions thereof toward the spring seat 23 have the same rotating (twisting) direction, to thereby turn the spring seat 23 in the circumferential direction around the axis of the spring. In this way, the spring structure 20 can exert a preferable performance. Further, both the upper and lower surfaces of the abutting plate portion 23a of the spring seat 23 are formed as flat surfaces, and the end portions of the clockwise spring 21 and the end portions of the counterclockwise spring 22 are formed as flat surfaces orthogonal to the axial direction of the spring structure 20. Therefore, the clockwise spring 21 and the counterclockwise spring 22 can be arranged in a right coaxial manner through the spring seat 23, and thereby performance of the spring structure 20 can be further improved.

In addition, the start point B of the effective winding at the lower end of the clockwise spring 21 and the start point B of the effective winding at the upper end of the counterclockwise spring 22 are shifted by 180 degrees in the circumferential direction around the axis of the spring, and hence, when the spring structure 20 shrinks, the boundary portion between the clockwise spring 21 and the counterclockwise spring 22 is prevented from being displaced together with the spring seat 23 in a direction orthogonal to the axial direction of the springs. In this way, the clockwise spring 21 and the counterclockwise spring 22 can be maintained to be straight arranged.

Further, the end portion toward the spring seat 23 of the clockwise spring 21 and that of the counterclockwise spring 22 are inserted, from above and below, into the inside of the tubular portion 23b of the spring seat 23. With this configuration, the clockwise spring 21 and the counterclockwise spring 22 can be coaxially held, and the end portion toward the spring seat 23 of the clockwise spring 21 and that of the counterclockwise spring 22 can be protected. In this regard, in a structure where surfaces of the springs 21, 22, on which the spring seat 23 abuts, are polished in order to increase the flat portion, and are bonded and fixed to the spring seat 23 with an adhesive, coaxial alignment of the springs 21, 22 can be further ensured, and the spring seat 23 can be united with both of the springs 21, 22. Consequently, preferable assemblability can be achieved.

Figure 9:
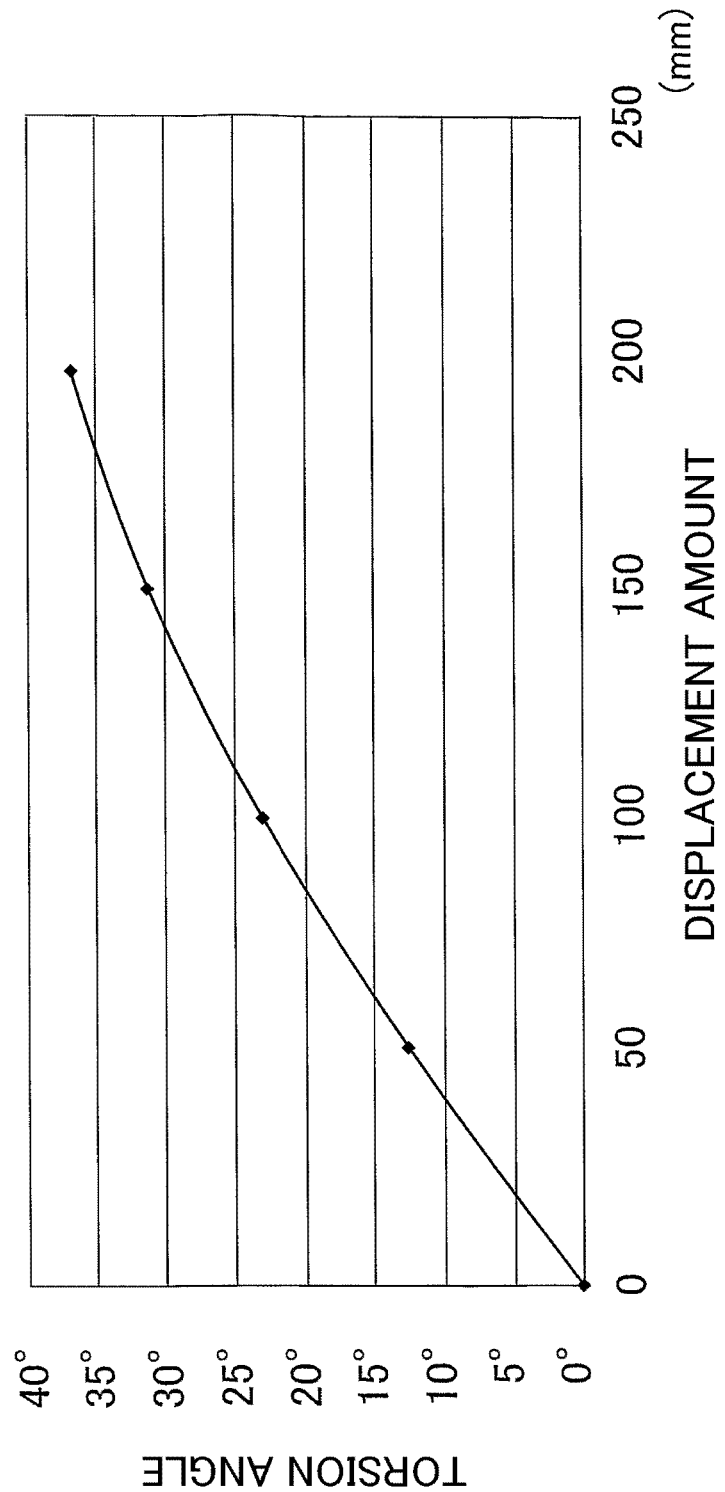
FIG. 9 is a graph showing a relation between a torsion angle and a displacement amount of a coil spring.

In addition, the clockwise spring 21 and the counterclockwise spring 22 have substantially the same characteristic for the torsion angle in the rotating direction with respect to the displacement amount of each of the springs, and hence substantially equal torsion angles occur in the clockwise spring 21 and the counterclockwise spring 22 at the time of their expansion and shrink. As a result, the torsional forces generated in the clockwise spring 21 and the counterclockwise spring 22 completely released in the rotating direction of the spring seat 23, and hence discrepancy in the rotating direction and forces in the rotating direction can be prevented from occurring at both ends of the spring structure 20. As shown in FIG. 9, this characteristic can be shown by a relation between a torsion angle (degree) and a displacement amount (mm) of the coil spring, and FIG. 9 shows the relation between the torsion angle and the displacement amount when using a coil spring with an axial length of 300 mm, an inner diameter of 70 mm, a element wire diameter of 11.5 mm, and the number of the effective winding of 8.0.

In this case, when no external force is applied to the coil spring, both a value of the torsion angle and a value of the displacement amount are "0", and the coil spring is not deformed. When the maximum external force within a range where the coil spring can be deformed is applied such that the value of the torsion angle and the value of the displacement amount are maximum, a gap between one part and another part of the coil spring is eliminated such that the one part and the another part become in close contact with each other. Further, when changing from a state of "0" to a state of "close contact", an increment of the torsion angle is slightly larger than the increment of the displacement amount in a range where the value of the torsion angle and the value of the displacement amount are small. In a range where the value of the torsion angle and the value of the displacement amount are large, an increment of the torsion angle is slightly smaller than the increment of the displacement amount. However, overall, the torsion angle and the displacement amount are increased in substantial proportion.

Figure 10:
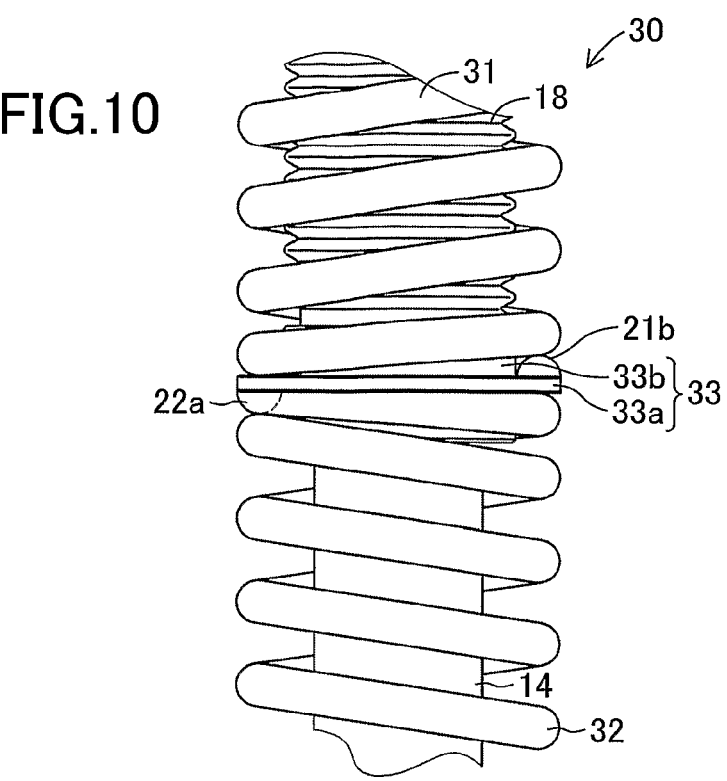
FIG. 10 is a front view of a main part of a spring structure according to a second embodiment.
Figure 11:
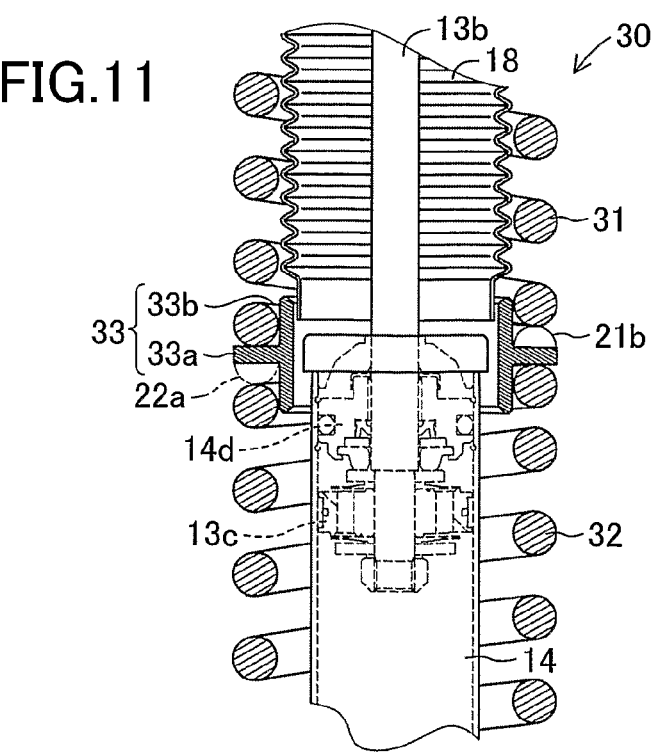
FIG. 11 is a sectional view of the main part of the spring structure according to the second embodiment.

FIG. 10 and FIG. 11 illustrate a main part of a spring structure 30 according to a second embodiment of the present invention. In the spring structure 30, a spring seat 33 includes an annular abutting plate portion 33a and a cylindrical tubular portion 33b defined as the coaxially holding portion in the present invention, the tubular portion 33b being coupled to the inner circumferential edge portion of the abutting plate portion 33a. The tubular portion 33b is arranged such that its axial direction is along the up-and-down direction, and is coupled to the abutting plate portion 33a under a state in which the inner circumference of the abutting plate portion 33a surrounds a center portion in the up-and-down direction of the outer peripheral surface of the tubular portion 33b. Further, a lower end portion of a clockwise spring 31 abuts on the upper surface of the abutting plate portion 33a, and an upper end portion of a counterclockwise spring 32 abuts on the lower surface of the abutting plate portion 33a. Further, the lower end portion of the clockwise spring 31 and the upper end portion of the counterclockwise spring 32 are engaged with the outer peripheral surface of the tubular portion 33b.

Other configurations of the spring structure 30 are the same as those of the above-mentioned spring structure 20. Therefore, the same components are denoted by the same reference symbols, and description thereof is omitted. According to the spring structure 30, the lower end portion of the clockwise spring 31 and the upper end portion of the counterclockwise spring 32 are engaged with the outer periphery of the tubular portion 33b, and thereby the clockwise spring 31 and the counterclockwise spring 32 can be coaxially held. Further, it is possible to prevent extraneous materials such as mud from being accumulated inside the tubular portion 33b. Other functions and effects of the spring structure 30 are the same as those of the above-mentioned spring structure 20. Alternately, also in the second embodiment, similarly to the first embodiment, both of the springs 31, 32 may be bonded to the spring seat 33. Also in that structure, the portions of the springs 31, 32, on which the spring seat 33 abuts, may be preferably polished so as to be flat surfaces.

Figure 12:
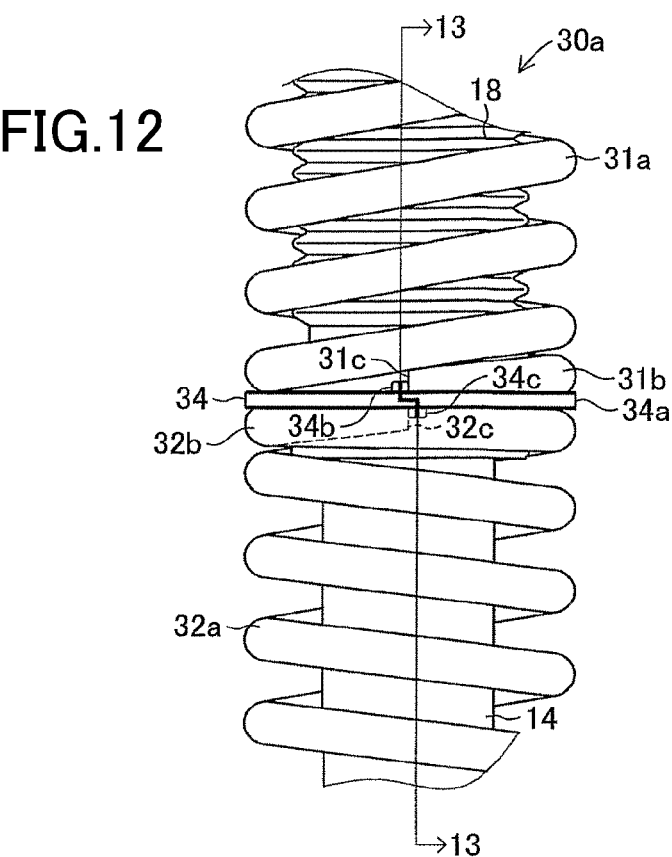
FIG. 12 is a front view of a main part of a spring structure according to Modified Example 1.
Figure 13:
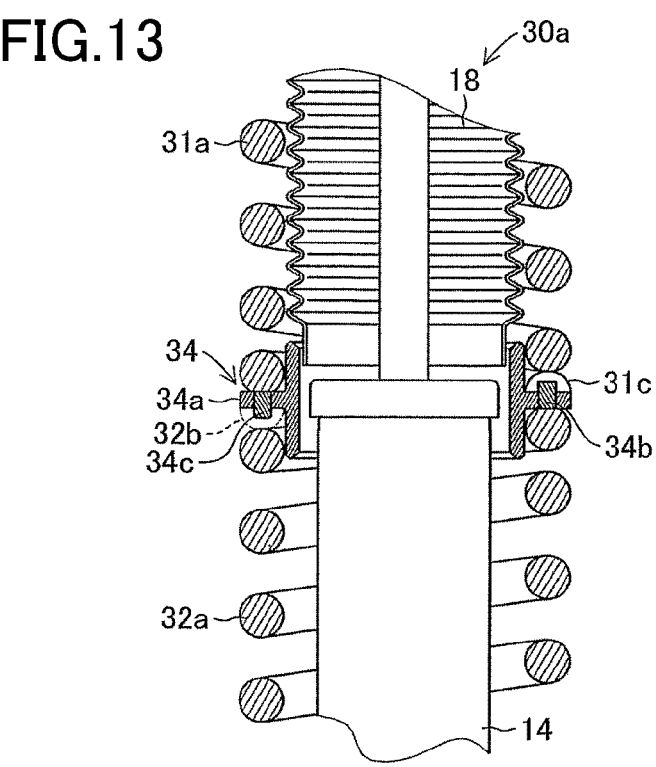
FIG. 13 is a sectional view taken along the line 13-13 of FIG. 12.

FIG. 12 and FIG. 13 illustrate a main part of a spring structure 30a according to Modified Example 1 for the above-mentioned spring structure 30. In the spring structure 30a, a spring seat 34 includes an abutting plate portion 34a, an engaging protrusion 34b, and an engaging protrusion 34c. The engaging protrusion 34b is formed on a predetermined portion of the abutting plate portion 34a, and protrudes from the upper surface of the abutting plate portion 34a. The engaging protrusion 34c is formed to be spaced apart by 180 degrees from the portion on which the engaging protrusion 34b is formed in the abutting plate portion 34a, and protrudes from the lower surface of the abutting plate portion 34a. Further, an end portion of an element wire of an end turn portion 31b formed at a lower end of a clockwise spring 31a forms an engaged surface 31c that is formed as substantially vertical plane. An end portion of an element wire of an end turn portion 32b formed at an upper end of a counterclockwise spring 32a forms an engaged surface 32c that is formed as substantially vertical plane.

The clockwise spring 31a is arranged on the upper side of the abutting plate portion 34a under a state in which the engaged surface 31c is abutted on the engaging protrusion 34b, and the counterclockwise spring 32a is arranged on the lower side of the abutting plate portion 34a under a state in which the engaged surface 32c is abutted on the engaging protrusion 34c. Other configurations of the spring structure 30a are the same as those of the above-mentioned spring structure 30. Therefore, the same components are denoted by the same reference symbols, and description thereof is omitted. According to the spring structure 30a, the lower end portion of the clockwise spring 31a and the upper end portion of the counterclockwise spring 32a can be positioned at appropriate positions on the spring seat 34 while being shifted precisely by 180 degrees. Other functions and effects of the spring structure 30a are the same as those of the above-mentioned spring structure 30. Note that, also in this embodiment, similarly to the first embodiment, the portions of the springs 31a, 32a, on which the spring seat 34 abuts, may be polished to form flat surfaces, and both of the springs 31a, 32a may be bonded to the spring seat 34.

Figure 14:
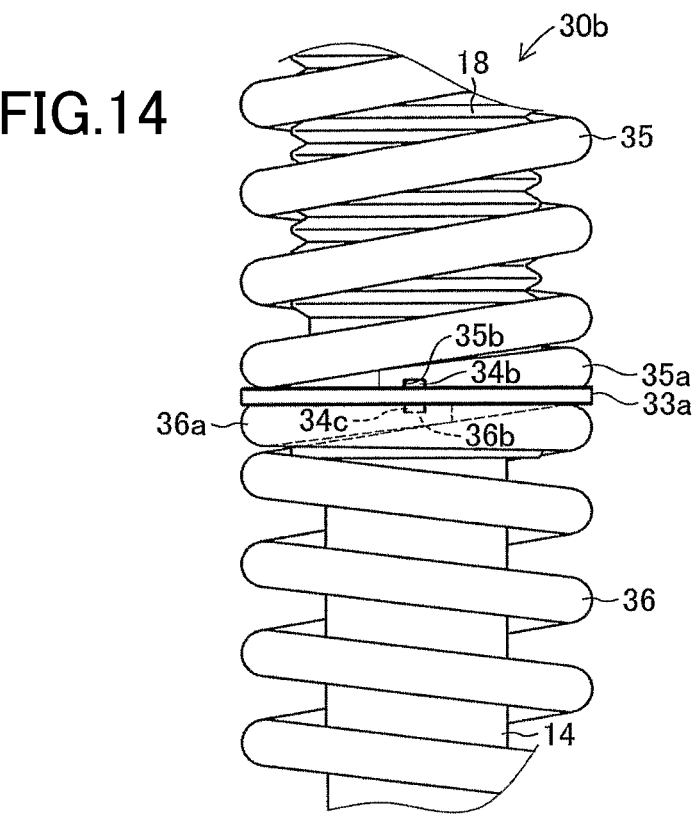
FIG. 14 is a front view of a main part of a spring structure according to Modified Example 2.
Figure 15:
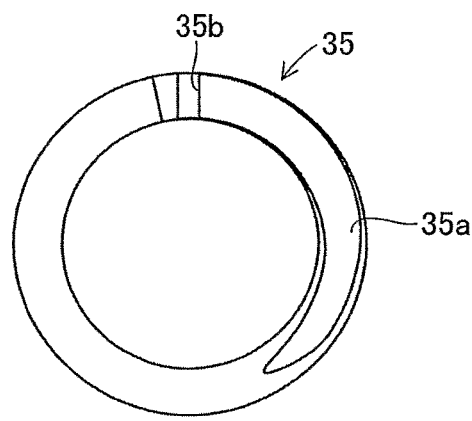
FIG. 15 is a bottom view of a lower surface of a clockwise spring provided to the spring structure according to Modified Example 2.

FIG. 14 illustrates a main part of a spring structure 30b according to Modified Example 2 for the above-mentioned spring structure 30. In the spring structure 30b, as illustrated in FIG. 15, an engaged recess 35b is formed in a lower surface of a distal end of an end turn portion 35a formed at a lower end of a clockwise spring 35, and, similarly to the engaged recess 35b illustrated in FIG. 15, an engaged recess 36b is formed in a upper surface of a distal end of an end turn portion 36a formed at an upper end of a counterclockwise spring 36. Other configurations of the spring structure 30b are the same as those of the above-mentioned spring structure 30a. Therefore, the same components are denoted by the same reference symbols, and description thereof is omitted.

In the spring structure 30b, the clockwise spring 35 is placed on the upper side of the abutting plate portion 34a under a state in which the engaged recess 35b is engaged on the engaging protrusion 34b. Further, the counterclockwise spring 36 is placed on the lower side of the abutting plate portion 34a under a state in which the engaged recess 36b is engaged on the engaging protrusion 34c. Thus, the lower end portion of the clockwise spring 35 and the upper end portion of the counterclockwise spring 36 can be positioned at appropriate positions on the spring seat 34 while being shifted precisely by 180 degrees. Other functions and effects of the spring structure 30b are the same as those of the above-mentioned spring structure 30. Also in this embodiment, similarly to the first embodiment, the portion of the springs 35, 36, on which the spring seat 34 abuts, may be polished to form flat surfaces, and both of the springs 35, 36 may be bonded to the spring seat 34.

In this regard, the spring structure 20 according to the first embodiment may be provided with the positioning section including the engaging protrusions 34b, 34c and the engaged surfaces 31c, 32c provided to the above-mentioned spring structure 30a according to Modified Example 1, or the engagement section including the engaging protrusions 34b, 34c and the engaged recesses 35b, 36b provided to the spring structure 30b according to Modified Example 2.

Figure 16:
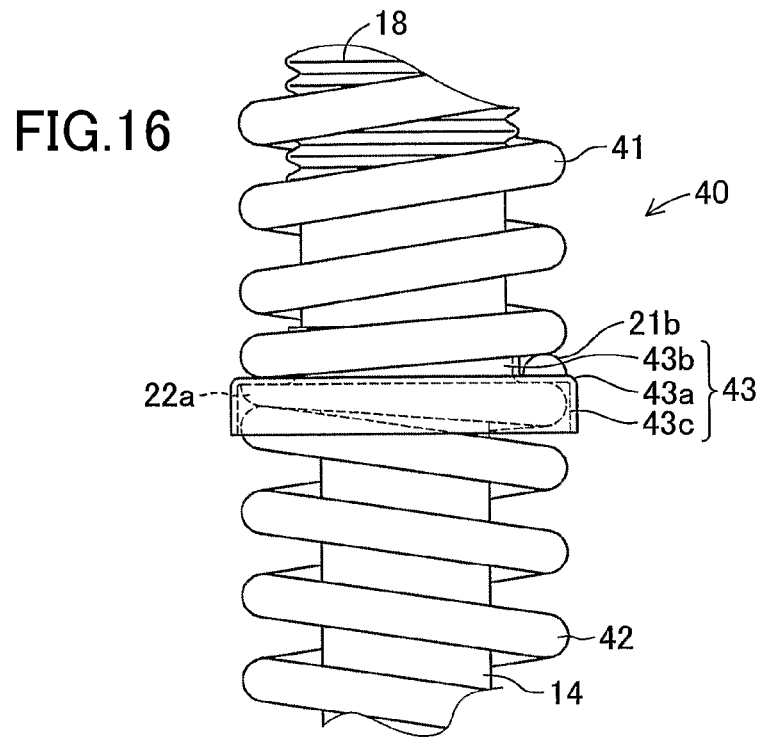
FIG. 16 is a front view of a main part of a spring structure according to a third embodiment.
Figure 17:
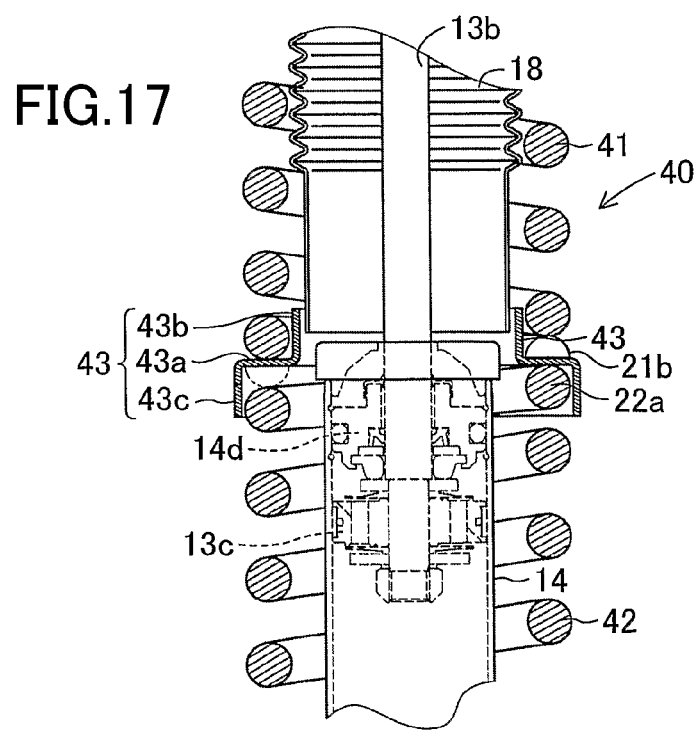
FIG. 17 is a sectional view of the main part of the spring structure according to the third embodiment.

FIG. 16 and FIG. 17 illustrate a main part of a spring structure 40 according to a third embodiment of the present invention. In the spring structure 40, a spring seat 43 is formed by pressing a sheet metal, and has a configuration in which a cylindrical tubular portion 43b is coupled to an inner circumference of an annular abutting plate portion 43a, and a cylindrical tubular portion 43c is coupled to an outer periphery of the annular abutting plate portion 43a. In this structure, the tubular portion 43b and the tubular portion 43c form the coaxially holding portion according to the present invention. The tubular portion 43b is arranged such that its axial direction is along the up-and-down direction, and is coupled to the abutting plate portion 43a under a state in which the inner circumference of the abutting plate portion 43a surrounds the lower end portion of the tubular portion 43b. Further, the tubular portion 43c is arranged such that its axial direction is along the up-and-down direction, and is coupled to the abutting plate portion 43a under a state in which the outer periphery of the abutting plate portion 43a is along the upper end portion of the tubular portion 43c.

The lower end portion of a clockwise spring 41 abuts on the upper surface of the abutting plate portion 43a, and the upper end portion of a counterclockwise spring 42 abuts on the lower surface of the abutting plate portion 43a. Further, the lower end portion of the clockwise spring 41 is engaged with the outer peripheral surface of the tubular portion 43b, and the upper end portion of the counterclockwise spring 42 is engaged with the inner circumferential surface of the tubular portion 43c. Other configurations of the spring structure 40 are the same as those of the above-mentioned spring structure 20. Therefore, the same components are denoted by the same reference symbols, and description thereof is omitted. According to the spring structure 40, the lower end portion of the clockwise spring 41 is engaged with the outer peripheral surface of the tubular portion 43b, and the upper end portion of the counterclockwise spring 42 is engaged with the inner circumferential surface of the tubular portion 43c. Consequently, the clockwise spring 41 and the counterclockwise spring 42 can be coaxially held. Other functions and effects of the spring structure 40 are the same as those of the above-mentioned spring structure 20. Also in this embodiment, portions of the springs 41, 42, on which the spring seat 43 abuts, may be polished to form flat surfaces, and both of the springs 41, 42 may be bonded to the spring seat 43.

Figure 18:
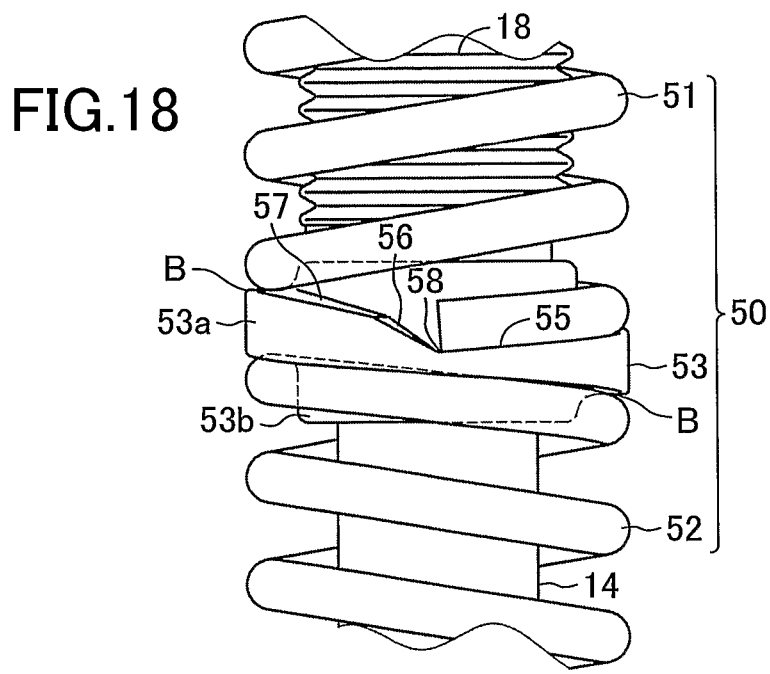
FIG. 18 is a front view of a main part of a spring structure according to a fourth embodiment.
Figure 19:
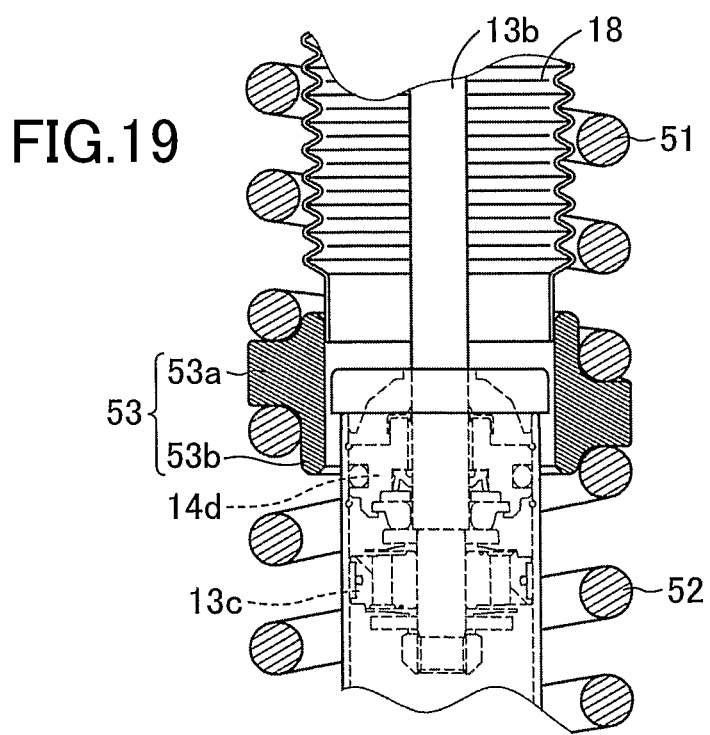
FIG. 19 is a sectional view of the main part of the spring structure according to the fourth embodiment.
Figure 20:
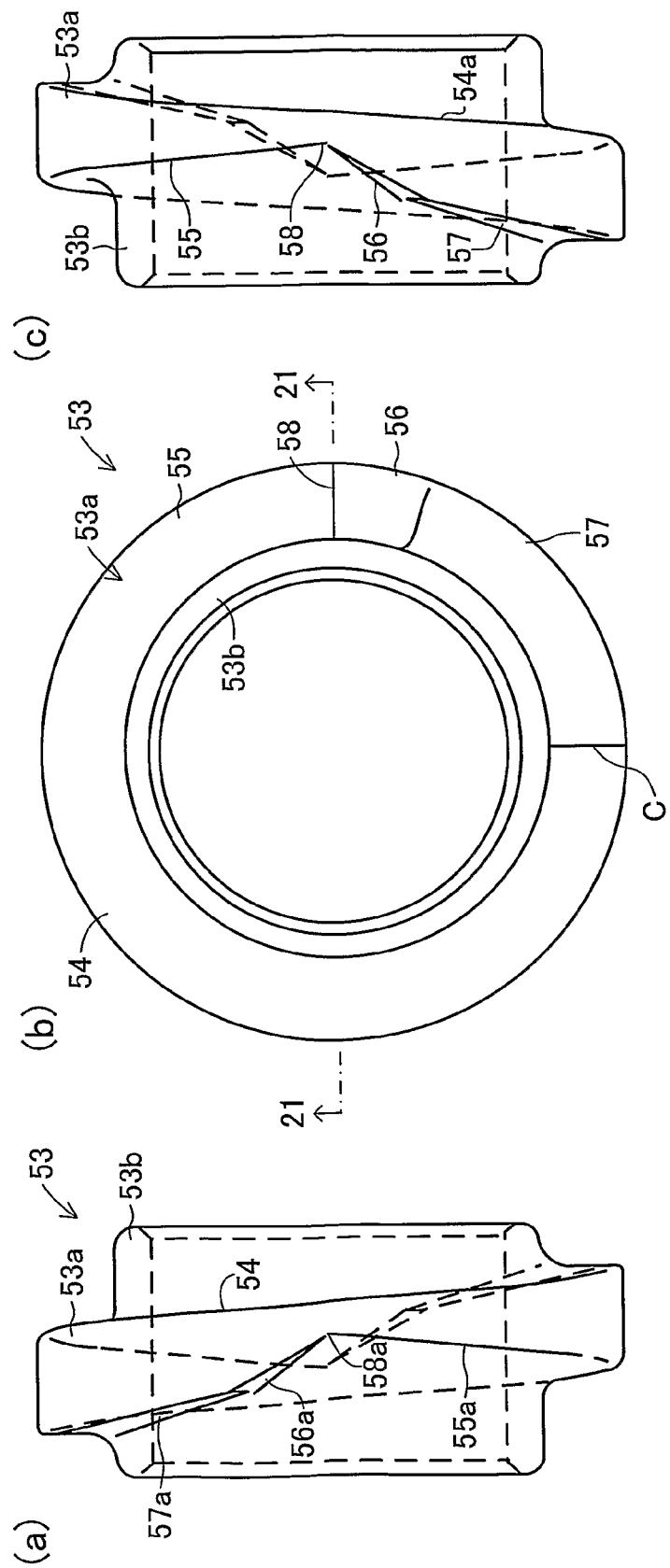
FIG. 20 illustrate a spring seat included in the spring structure according to the fourth embodiment, in which a part (a) is a left-hand side view, a part (b) is a plan view, and a part (c) is a right-hand side view.

FIG. 18 and FIG. 19 illustrate a main part of a spring structure 50 according to a fourth embodiment of the present invention. In the spring structure 50, a lower end portion of a clockwise spring 51 and an upper end portion of a counterclockwise spring 52 are not provided with the processing and thus have a shape made just by cutting. A spring seat 53 includes an annular abutting plate portion 53a and a cylindrical tubular portion 53b illustrated in FIG. 20 and FIG. 21. FIG. 20(b) is a plan view of the spring seat 53, FIG. 20(a) is a left-hand side view of FIG. 20(b), and FIG. 20(c) is a right-hand side view of FIG. 20(b). The right side and the left side of FIG. 20(a) correspond to the upper side and the lower side of the spring seat 53, respectively, and the right side and the left side of FIG. 20(c) correspond to the lower side and the upper side of the spring seat 53, respectively. The spring seat 53 is integrally molded of aluminum alloy or a resin.

The tubular portion 53b is formed into a cylindrical shape with a short axial length. The abutting plate portion 53a is coupled onto the outer peripheral surface of the tubular portion 53b, and is formed into a plate portion which has a plurality of inclined surfaces formed on each of upper and lower surfaces of the plate portion and changing in the up-and-down direction. Specifically, a left half of FIG. 20(b) of the upper surface of the abutting plate portion 53a forms an inclined surface 54 that is inclined at a constant inclination from the upper part of FIG. 20(b) to the lower part thereof. A right half of FIG. 20(b) of the upper surface of the abutting plate portion 53a forms a curved surface that has three aligned inclined surfaces such that a center portion (right end of FIG. 20(b)) of the curved surface is recessed downward.

The right half of FIG. 20(b) of the upper surface of the abutting plate portion 53a has a part from the upper part of FIG. 20(b) to the right end of the same figure, the part forming an inclined surface 55 that is continuous with the inclined surface 54 and is gradually inclined at the same constant inclination as that of the inclined surface 54. Further, the right half of FIG. 20(b) of the upper surface of the abutting plate portion 53a has a part from the right end of FIG. 20(b) to halfway down the bottom of the same figure, the part forming an inclined surface 56 which has a short circumferential length and is gradually inclined at an inclination larger than that of the inclined surface 55. Further, a part of FIG. 20(b) from the lower end of the inclined surface 56 to the lower end of the inclined surface 54 forms an inclined surface 57 that is gradually inclined at an inclination smaller than that of the inclined surface 56. Thus, a recess 58 recessed downward is formed between the inclined surface 55 and the inclined surface 56.

Figure 21:
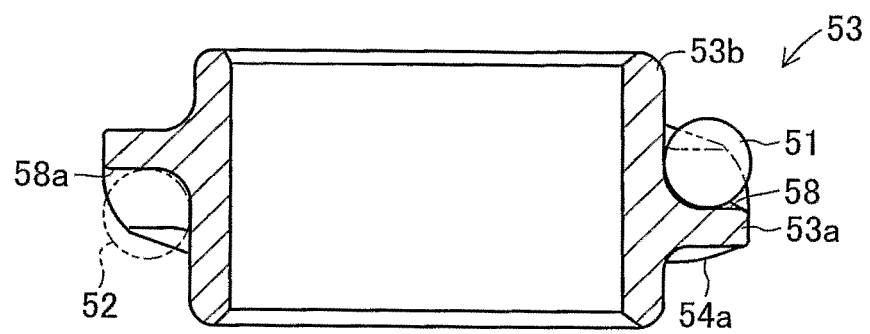
FIG. 21 is a sectional view taken along the line 21-21 of FIG. 20(b)

A lower surface of the abutting plate portion 53a is symmetrical about a point with the upper surface of the abutting plate portion 53a, and thus includes inclined surfaces 54a, 55a, 56a, 57a and a recess 58a that respectively correspond to the inclined surface 54, 55, 56, 57 and the recess 58 in the upper surface thereof. The recess 58a is recessed upward, and is spaced apart by 180 degrees in the circumferential direction from the recess 58 in the upper surface. The recesses 58, 58a serve as an engagement recess according to the present invention. Further, as illustrated in FIG. 18, the lower portion of the clockwise spring 51 abuts on the spring seat 53 while being arranged along the inclined surfaces 54, 55. As illustrated in FIG. 18 and FIG. 21, a corner of the end portion of the element wire of the clockwise spring 51 is located at a position defined by the recess 58.

Similarly, the upper portion of the counterclockwise spring 52 abuts on the spring seat 53 while being arranged along the inclined surfaces 54a, 55a. A corner of the end portion of the element wire of the counterclockwise spring 52 is located at a position defined by the recess 58a as illustrated in FIG. 21. The recesses 54, 55, 56, 58 and the recesses 54a, 55a, 56a, 58a serve as a recess according to the present invention. Note that, the lower portion of the clockwise spring 51 and the upper portion of the counterclockwise spring 52 are not provided with the end turn portion. And thus, the lower portion of the clockwise spring 51 is formed at the same pitch as a central portion of the clockwise spring 51, and the upper portion of the counterclockwise spring 52 is formed at the same pitch as a central portion of the counterclockwise spring 52. However, in a structure where the clockwise spring 51 and the counterclockwise spring 52 are abutted on the spring seat 53, substantive start points of the effective winding exist as described below.

In this structure, the start point of the effective winding at the lower end of the clockwise spring 51 is defined as a point at which the lower portion of the clockwise spring 51 is separated from the inclined surfaces 55, 54 of the spring seat 53, that is, a portion of the clockwise spring 51 facing a boundary portion C between the inclined surface 54 and inclined surface 57. The start point of the effective winding at the upper end of the counterclockwise spring 52 is defined as a point at which the upper portion of the counterclockwise spring 52 is separated from the inclined surfaces 55*a*, 54*a* of the spring seat 53, that is, a portion of the counterclockwise spring 52 facing a boundary portion between the inclined surface 54*a* and the inclined surface 57*a*. Each of the clockwise spring 51 and the counterclockwise spring 52 is substantially provided with an end turn portion of ¾ of a turn. Other configurations of the spring structure 50 are the same as those of the above-mentioned spring structure 20. Therefore, the same components are denoted by the same reference symbols, and description thereof is omitted.

According to the spring structure 50, the lower end portion of the clockwise spring 51 and the upper end portion of the counterclockwise spring 52 are not provided with the processing and thus have a shape made just by cutting. And hence, it is possible to reduce manufacturing cost. Further, an abutment position between the lower end portion of the clockwise spring 51 and the spring seat 53 and an abutment position between the upper end portion of the counterclockwise spring 52 and the spring seat 53 are shifted by 180 degrees in a circumferential direction of the spring seat 53, and hence the clockwise spring 51 and the counterclockwise spring 52 applies forces to the spring seat 53 with good balance, to thereby stabilize a posture of the spring seat 53.

Further, the end portions of the element wires, which made just by cutting, of the upper and lower springs are shifted by 180 degrees, and the abutting plate portion 53*a* forms the plate portion in which the plurality of inclined surfaces changing in the up-and-down direction and the engagement recess 58/58*a* are formed on the upper/lower surface of the plate portion. Thus, the lower end portion of the clockwise spring 51 and the upper end portion of the counterclockwise spring 52 can partially overlap each other in the up-and-down direction, and hence it is possible to reduce the length in axial direction of the spring structure 50. In this regard, the recesses 58, 58*a*, which are respectively provided in the upper surface and the lower surface of the abutting plate portion 53*a*, may be shifted in the circumferential direction by other than 180 degrees, for example, by within a range of 180±45 degrees. Other functions and effects of the spring structure 50 are the same as those of the above-mentioned spring structure 20.

Figure 22:
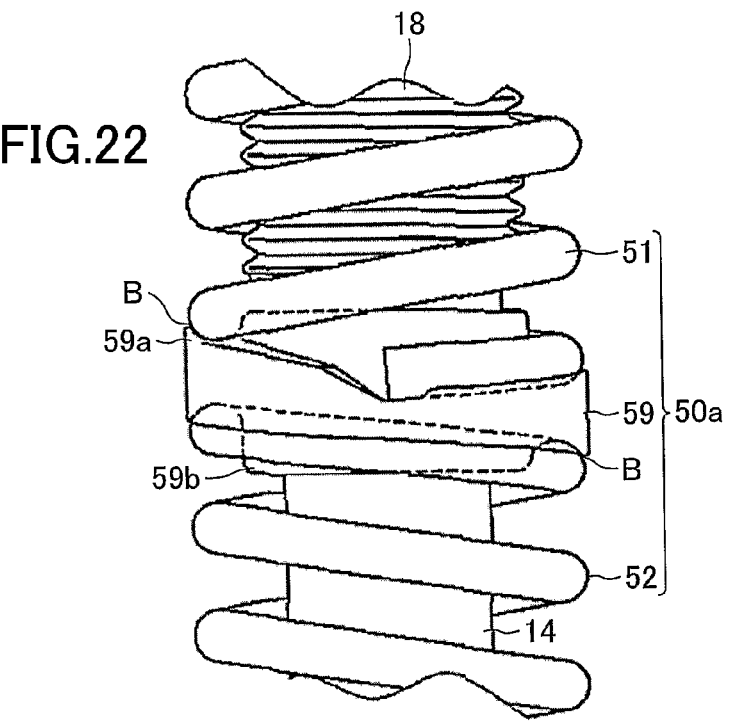
FIG. 22 is a front view of a main part of a spring structure according to Modified Example 3.
Figure 23:
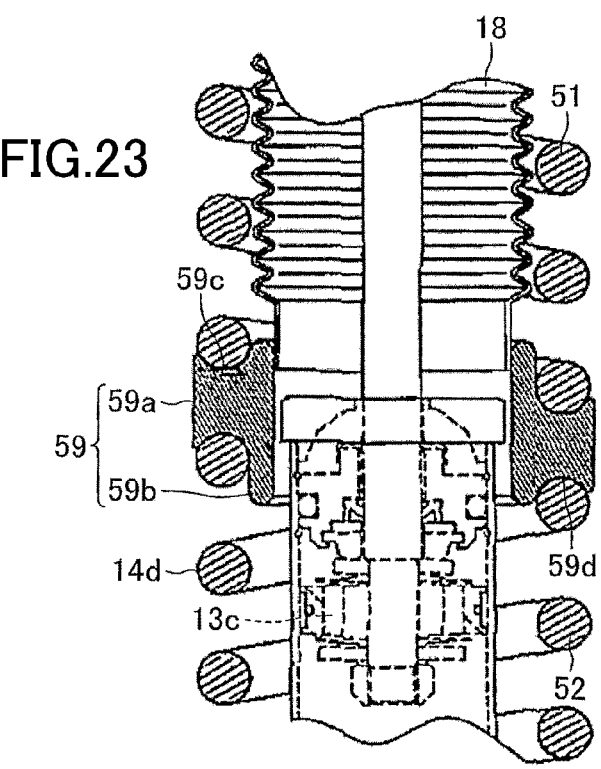
FIG. 23 is a sectional view of the main part of the spring structure according to Modified Example 3.

FIG. 22 and FIG. 23 illustrate a main part of a spring structure 50*a* according to Modified Example 3 defined as Modified Example of the above-mentioned spring structure 50. In the spring structure 50*a*, a spring seat 59 has a configuration similar to the configuration of the above-mentioned spring seat 53. Specifically, the spring seat 59 includes an annular abutting plate portion 59*a* and a cylindrical tubular portion 59*b*, whereas a groove-like recess 59*c* having a semi-circular cross-sectional shape is formed in the upper surface of the abutting plate portion 59*a* and a groove-like recess 59*d* having a semi-circular cross-sectional shape is formed in the lower surface of the abutting plate portion 59*a*. The groove-like recess 59*c* substantially conforms in shape to the lower portion of the outer peripheral surface of the clockwise spring 51 in order to increase the contact area between the lower end portion of the clockwise spring 51 and the recess 59*c*. The groove-like recess 59*d* substantially conforms in shape to the lower portion of the outer peripheral surface of the counterclockwise spring 52 in order to increase the contact area between the upper end portion of the counterclockwise spring 52 and the recess 59*d*. Further, surfaces of the groove-like recesses 59*c*, 59*d*, the lower surface of the clockwise spring 51, and the upper surface of the counterclockwise spring 52 are polished. By applying an adhesive onto the polished surfaces, the groove-like recess 59*c* and the lower end portion of the clockwise spring 51 are bonded to each other, and the groove-like recess 59*d* and the upper end portion of the counterclockwise spring 52 are bonded to each other. Other configurations of the spring structure 50*a* are the same as those of the above-mentioned spring structure 50.

With this configuration, axial alignment between the clockwise spring 51 and the counterclockwise spring 52 is ensured, and the spring seat 53 is integrated with both of the springs 51, 52. Consequently, satisfactory assemblability is achieved. Other functions and effects of the spring structure 50*a* are the same as those of the above-mentioned spring structure 50.

Figure 25:
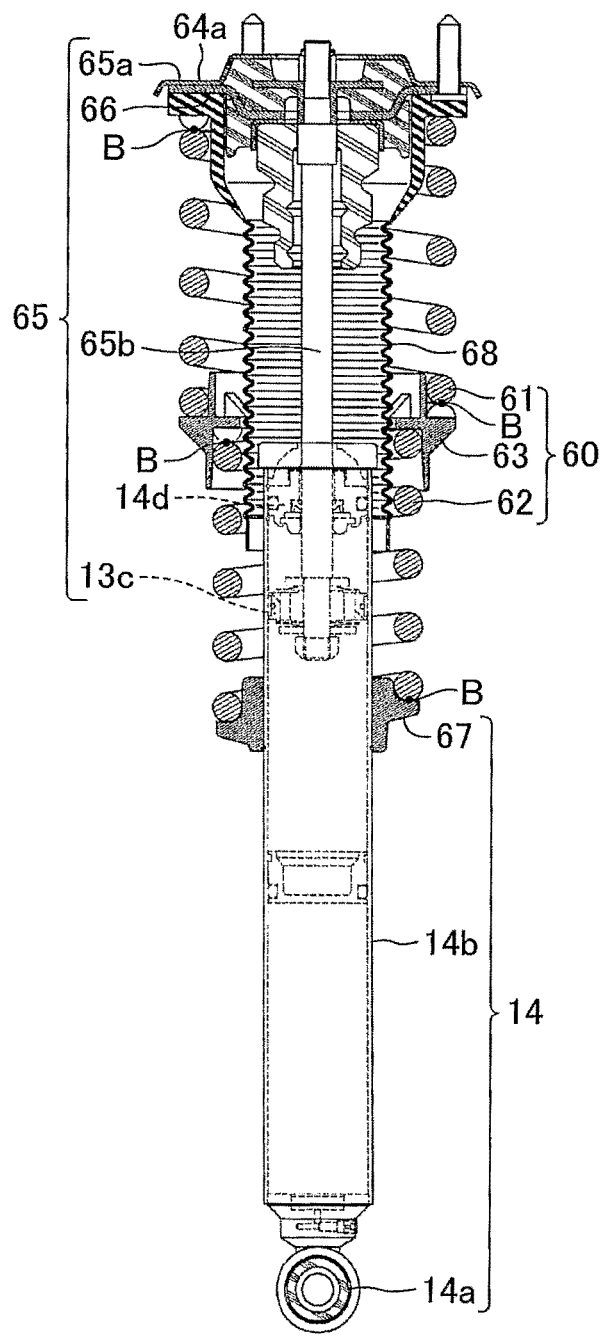
FIG. 25 is a sectional view taken along the line 25-25 of FIG. 24(a)

FIG. 24 and FIG. 25 illustrate a state in which a spring structure 60 according to a fifth embodiment of the present invention is mounted to the damper D. In the spring structure 60, a clockwise spring 61 arranged on the upper side of the spring structure 60 has a diameter larger than a diameter of a counterclockwise spring 62 arranged on the lower side thereof. Specifically, the counterclockwise spring 62 has substantially the same diameter and length as those of the above-mentioned counterclockwise spring 22 or the like, whereas the clockwise spring 61 employs a compression coil spring having a diameter larger than that of the above-mentioned counterclockwise spring. Thus, the damper D to which the spring structure 60 is mounted includes an upper spring seat portion 66 formed on a fixed portion 65*a* of an inner shaft portion 65 and having a diameter corresponding to the diameter of the clockwise spring 61. Similarly to the above-mentioned embodiments, a piston rod 65*b* is covered with a bellows-like cover member 68.

Figure 27:
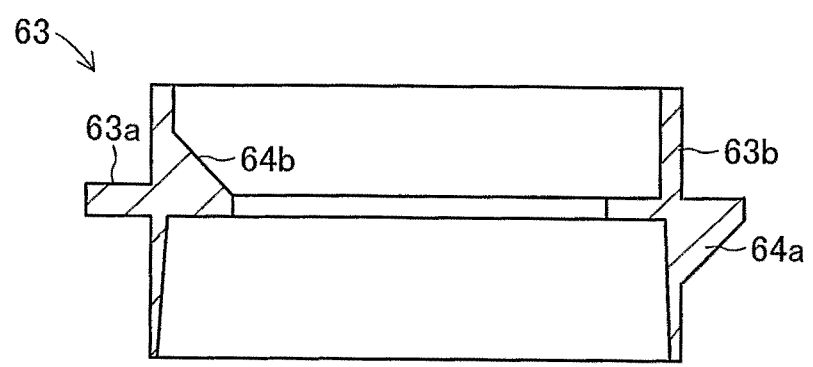
FIG. 27 is a sectional view taken along the line 27-27 of FIG. 26(c)

Further, a lower spring seat portion 67 has a configuration similar to the configuration of the above-mentioned spring seat 53, and the lower end portion of the counterclockwise spring 62 is located at a position defined by a recess 67*a* formed in the upper surface of the lower spring seat portion 67. In the spring structure 60, the both upper and lower end portions of the clockwise spring 61 and the upper end portion of the counterclockwise spring 62 are formed into flat surfaces orthogonal to the axial direction of the spring structure 60. The lower end portion of the counterclockwise spring 62 has a shape made just by cutting and are not provided with an end turn portion. As illustrated in FIG. 26 and FIG. 27, a spring seat 63 includes an abutting plate portion 63*a*, a tubular portion 63*b*, and a plurality of ribs 64*a*, 64*b* provided on both upper and lower surfaces of the abutting plate portion 63*a*, respectively.

The tubular portion 63*b* is formed into a cylindrical shape with a short length in the axial direction. The abutting plate portion 63*a* is formed into an annular plate portion protruding both radially outwardly and radially inwardly from a center portion in the axial direction of the tubular portion 53*b*. Further, the six ribs 64*a* are formed at equal intervals in the circumferential direction and each of the ribs 64*a* bridges between the upper surface of the inner circumference of the abutting plate portion 63*a* and the inner circumferential surface of the tubular portion 63*b*. The six ribs 64*b* are formed at equal intervals in the circumferential direction and each of the six ribs 64*b* bridges between the lower surface of the outer peripheral part of the abutting plate portion 63*a* and the outer peripheral surface of the tubular portion 63*b*. The ribs 64*a* and the ribs 64*b* are arranged in a staggered manner along the circumferential direction such that each of the ribs 64*a* is situated at a center between the two adjacent ribs 64*b* in a state illustrated in FIG. 26(a) and FIG. 26(c). Alternately, positions in the circumferential direction of the ribs 64a, 64b may be aligned.

The upper and lower surfaces of the abutting plate portion 63a are formed into flat surfaces. The lower end portion of the clockwise spring 61 abuts on the upper surface of the outer peripheral part of the abutting plate portion 63a. The upper end portion of the counterclockwise spring 62 abuts on the lower surface of the inner circumferential part of the abutting plate portion 63a. Further, the lower end portion of the clockwise spring 61 is engaged with the outer peripheral surface of the tubular portion 63b, and the upper end portion of the counterclockwise spring 62 is engaged with the inner circumferential surface of the tubular portion 63b. Other configurations of the spring structure 60 are the same as those of the above-mentioned spring structure 20. Therefore, the same components are denoted by the same reference symbols, and description thereof is omitted.

According to the spring structure 60, the spring structure 60 can be arranged while not inviting interference with the front wheel FL/FR even when the counterclockwise spring 62 is positioned in the vicinity of the front wheel FL/FR to consequently have a narrow space for the arrangement, for example, the spring structure 60 is arranged in proximity to the front wheel FL/FR. Specifically, while increasing strength of the spring structure 60 by employing a large spring as the clockwise spring 61, the counterclockwise spring 62 can be arranged in the narrow space by employing a small spring as the counterclockwise spring 62. Other functions and effects of the spring structure 60 are the same as those of the above-mentioned spring structure 20. Alternately, also in this structure, a portion of each of the springs 61, 62, on which the spring seat 63 abuts, may be polished to increase a flat surface portion, and both of the springs 61, 62 may be bonded to the spring seat 63.

Figure 28:
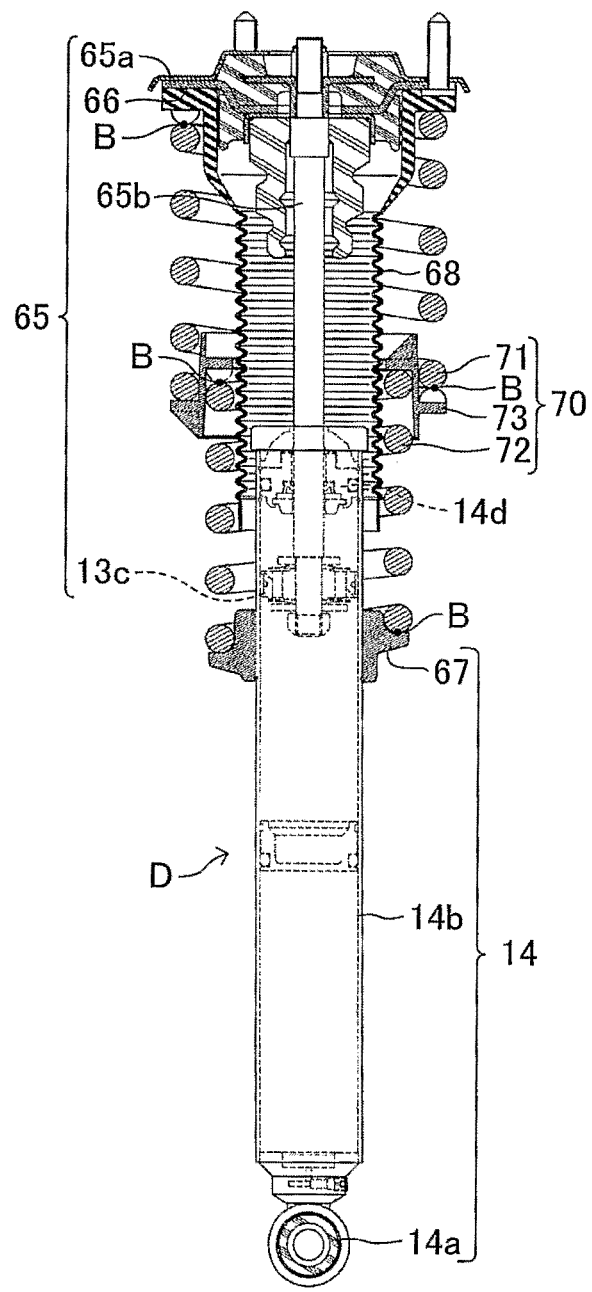
FIG. 28 is a sectional view of a spring structure according to a sixth embodiment.
Figure 29:
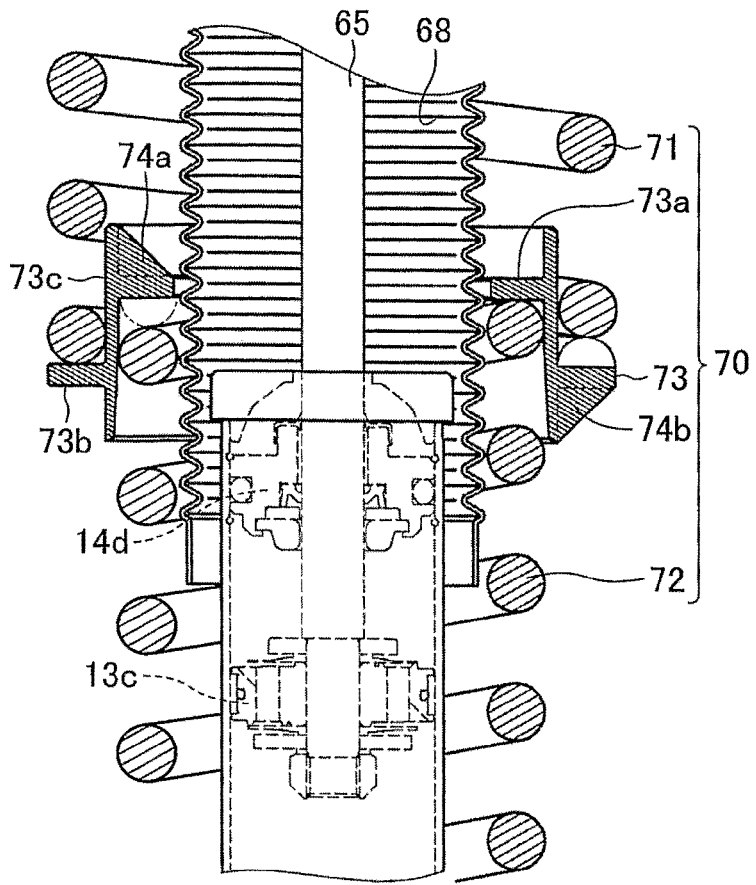
FIG. 29 is a sectional view of a main part of the spring structure according to the sixth embodiment.
Figure 30:
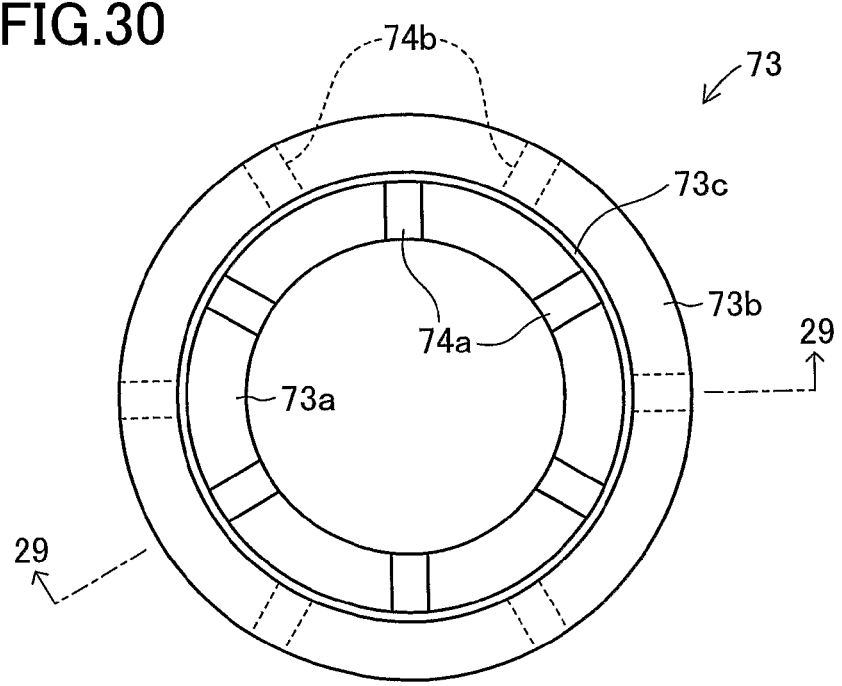
FIG. 30 is a plan view of a spring seat included in the spring structure according to the sixth embodiment.

FIG. 28 illustrates a state in which a spring structure 70 according to a sixth embodiment of the present invention is mounted to the damper D. In the spring structure 70, a spring seat 73 includes, as illustrated in FIG. 29 and FIG. 30 (FIG. 29 is a sectional view of the spring seat 73 taken along the line 29-29 of FIG. 30), an upper abutting plate portion 73a, a lower abutting plate portion 73b, a tubular portion 73c, a plurality of ribs 74a provided on the upper surface of the upper abutting plate portion 73a, and a plurality of ribs 74b provided on the lower surface of the lower abutting plate portion 73b. The tubular portion 73c is formed into a cylindrical shape with a short length in the axial direction. The upper abutting plate portion 73a forms an annular plate portion protruding radially inwardly from a higher position than a center portion in the axial direction of the inner circumferential surface of the tubular portion 73c. The lower abutting plate portion 73b forms an annular plate portion protruding radially outwardly from a lower position than a center portion in the axial direction of the outer peripheral surface of the tubular portion 73c.

Further, the six ribs 74a are formed at equal intervals in the circumferential direction and each of the six ribs 74a bridges between the upper surface of the upper abutting plate portion 73a and the inner circumferential surface of the tubular portion 73c. The six ribs 74b are formed at equal intervals in the circumferential direction and each of the six ribs 74b bridges between the lower surface of the lower abutting plate portion 73b and the outer peripheral surface of the tubular portion 73c. The ribs 74a and the ribs 74b are arranged in a staggered manner along the circumferential direction, and each of the ribs 74a is situated at a center portion between the two adjacent ribs 74b in a state illustrated in FIG. 30. The upper and lower surfaces of the upper abutting plate portion 73a and the upper and lower surfaces of the lower abutting plate portion 73b are shaped into flat surfaces. An upper end portion of a counterclockwise spring 72 abuts on the lower surface of the upper abutting plate portion 73a. A lower end portion of a clockwise spring 71 abuts on the upper surface of the lower abutting plate portion 73b.

Further, the lower end portion of the clockwise spring 71 is engaged with the outer peripheral surface of the tubular portion 73c, and the upper end portion of the counterclockwise spring 72 is engaged with the inner circumferential surface of the tubular portion 73c. The clockwise spring 71 and the counterclockwise spring 72 partially overlap each other in the up-and-down direction. Other configurations of the spring structure 70 are the same as those of the above-mentioned spring structure 60. Therefore, the same components are denoted by the same reference symbols, and description thereof is omitted. According to the spring structure 70, it is possible to reduce the length in the axial direction. Other functions and effects of the spring structure 70 are the same as those of the above-mentioned spring structure 60. Also in this structure, a portion of each of the springs 71, 72, on which the spring seat 73 abuts, may be polished to increase a flat surface portion, and both of the springs 71, 72 may be bonded to the spring seat 63.

Note that, the above-mentioned spring structures 20 to 70 according to the first to sixth embodiments and Modified Examples 1 to 3 may be assembled to the rear part of the suspension of the automobile illustrated in FIG. 2. Specifically, the spring structure 20a arranged toward the rear wheel RL/RR illustrated in FIG. 2 is mounted separately from the damper D, and is arranged at a position between a shaft S (moving section) for connecting the rear wheel RL/RR and the body 11 (base) while being spaced from the damper D. The spring structure 20a may employ any one of the above-mentioned spring structures 20, 30, 30a, 30b, 40, 50, 50a, 60, 70.

Figure 31:
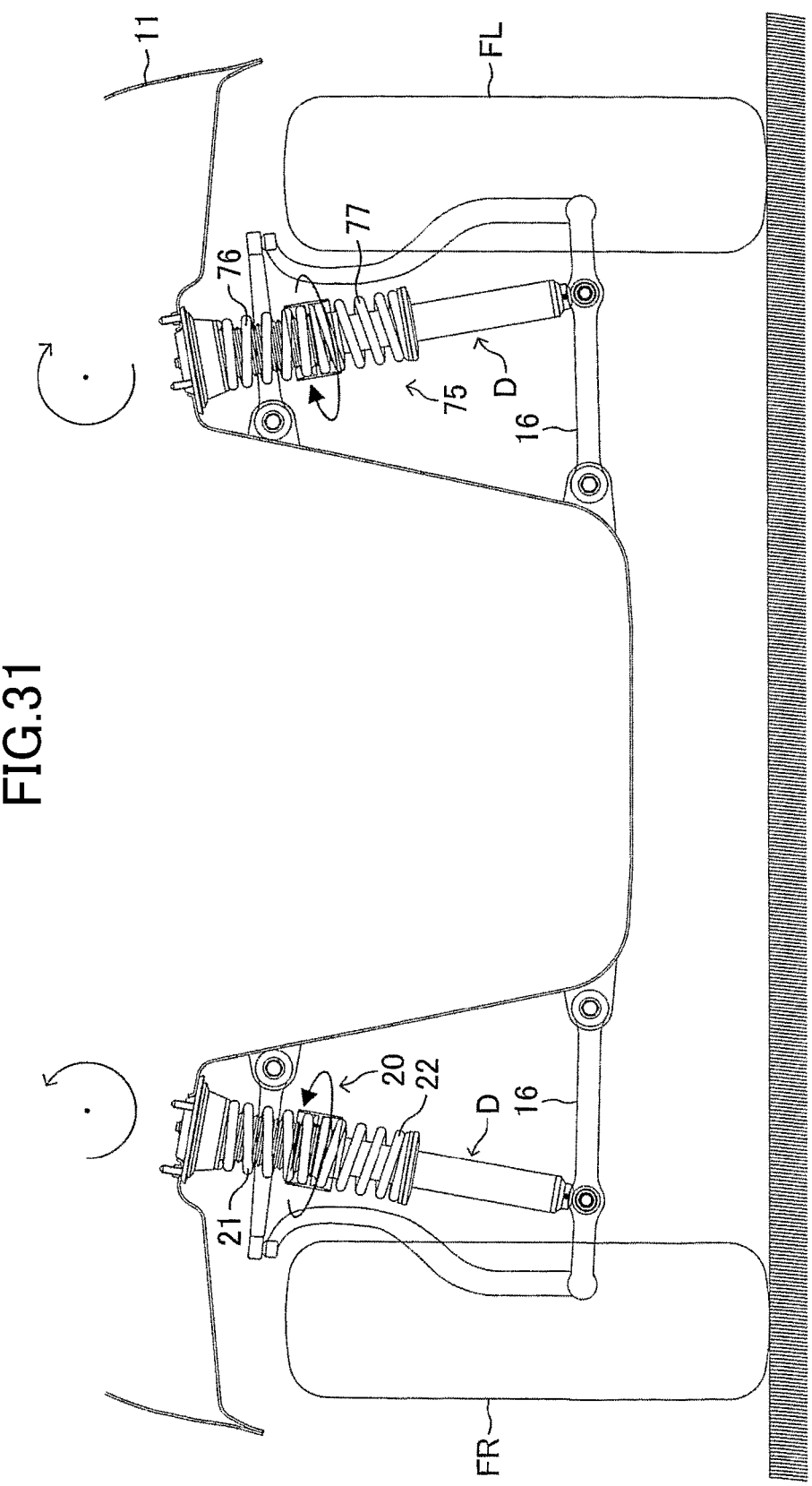
FIG. 31 is an explanatory diagram illustrating a state in which the spring structure according to the first embodiment and a spring structure different from the former spring structure in arrangement of the clockwise spring and a counterclockwise spring are mounted to the body.
Figure 32:
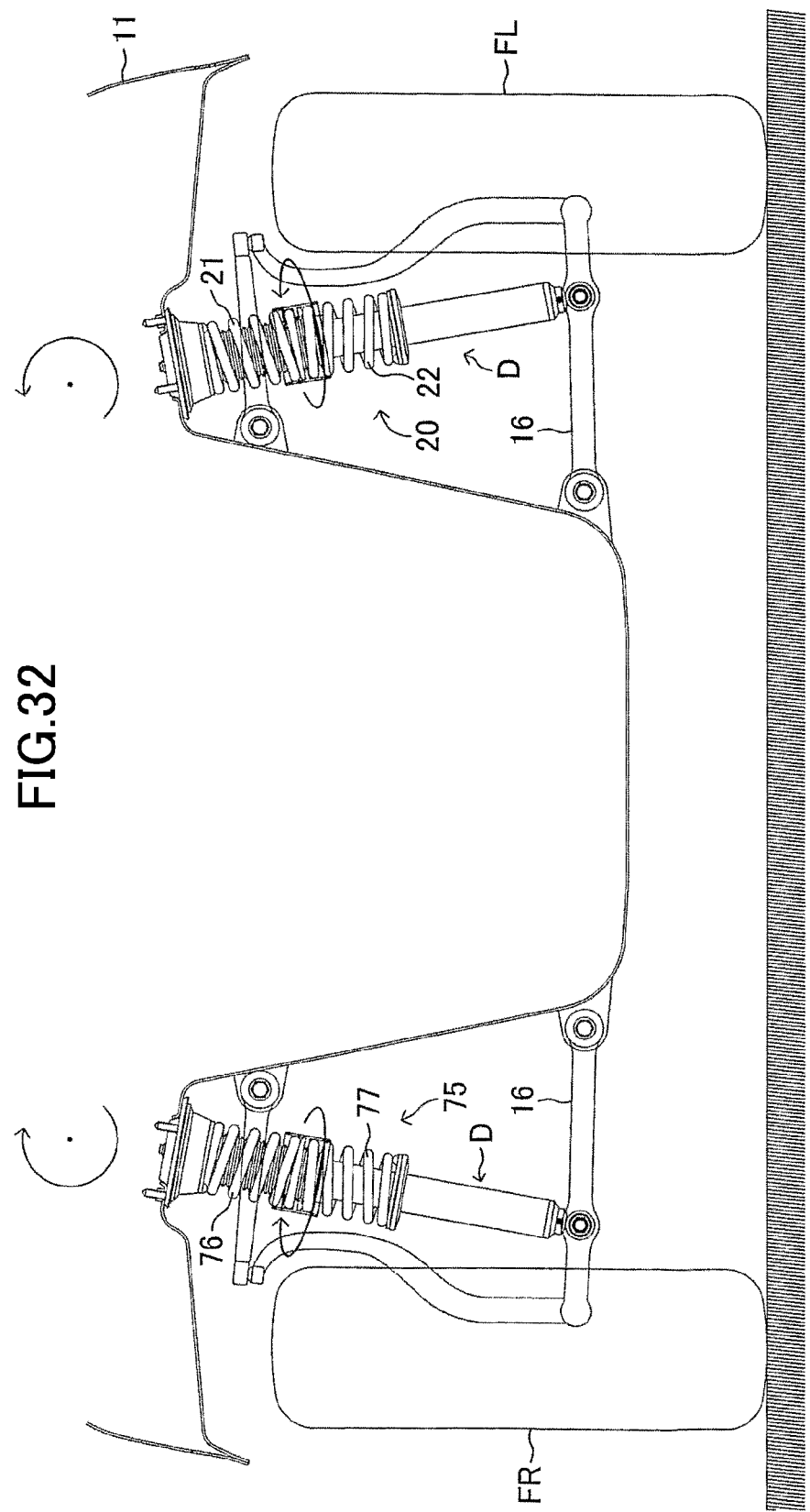
FIG. 32 is an explanatory diagram illustrating a state in which both the spring structures illustrated in FIG. 31 that are in arrangement reverse to that of FIG. 31 are mounted to the vehicle body.

Further, when assembling the above-mentioned spring structures 20 to 70 according to the first to sixth embodiments and Modified Examples 1 to 3 to a front part of the suspension of the automobile, the following arrangement is preferable as illustrated in FIG. 31 and FIG. 32. That is, any one of the spring structures 20 to 70, for example, the spring structure 20, where the clockwise spring 21 is arranged in the upper portion of the spring structure and the counterclockwise spring 22 is arranged in the lower portion thereof, is assembled to one of the dampers D. Further, a spring structure 75 is assembled to the other of the dampers D and has the same configuration as that of the spring structure 20, except that a counterclockwise spring 76 is arranged in the upper portion of the spring structure and a clockwise spring 77 is arranged in the lower portion thereof. FIG. 31 illustrates a front view of the vehicle body 11 in which the spring structure 20 is arranged toward the front wheel FR and the spring structure 75 is arranged toward the front wheel FL. FIG. 32 illustrates a front view of the vehicle body 11 in which the spring structure 75 is arranged toward the front wheel FR and the spring structure 20 is arranged toward the front wheel FL.

With this configuration, when the spring structure 20 and the spring structure 75 expand and shrink, the spring seat 23 of the spring structure 20 and the spring seat 23 of the spring structure 75 rotate in directions opposing to each other. Specifically, in the state illustrated in FIG. 31, in a case where the spring seat 23 rotates in a counterclockwise direction when the spring structure 20 is viewed from above, the spring seat 23 rotates in a clockwise direction when the spring structure 75 is viewed from above. Thus, the front portion of the vehicle body 11 is supported by the front wheels FR, FL through the spring structures 20, 75 with good balance. Similarly, in the state illustrated in FIG. 32, in a case where the spring seat 23 rotates in the clockwise direction when the spring structure 75 is viewed from above, the spring seat 23 rotates in the counterclockwise direction when the spring structure 20 is viewed from above. Thus, the front portion of the vehicle body 11 is supported by the front wheels FR, FL through the spring structures 20, 75 with good balance.

Figure 33:
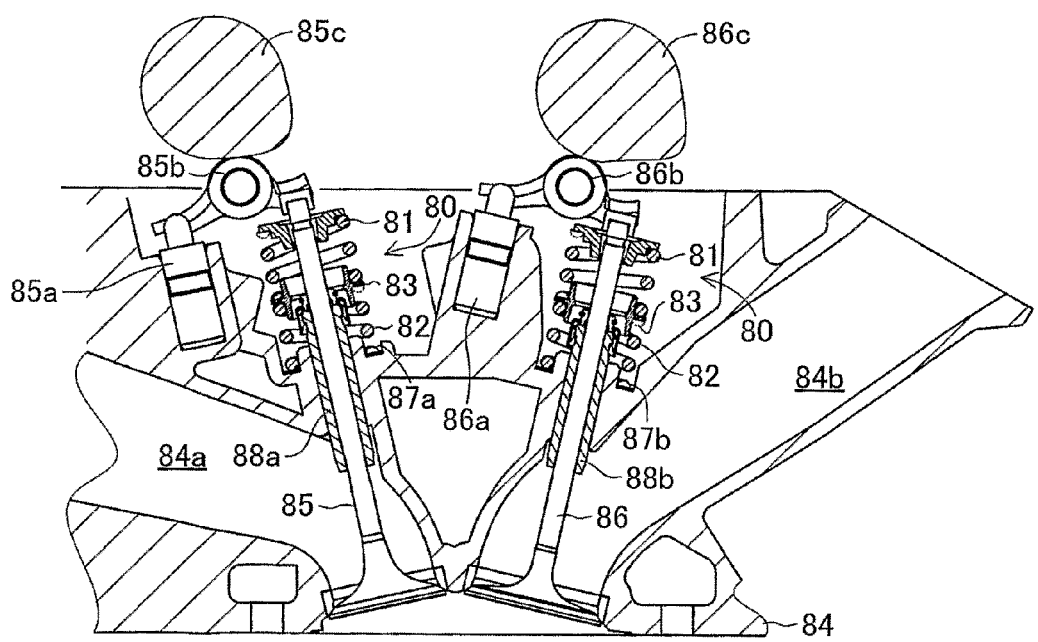
FIG. 33 is a sectional view illustrating a state in which a spring structure according to a seventh embodiment is assembled to each of an intake valve and an exhaust valve of an engine.

FIG. 33 illustrates a spring structure 80 according to a seventh embodiment of the present invention. Except for being inverted in up-and-down direction, the spring structure 80 has the same configuration as that of the above-mentioned spring structure 30, and includes a counterclockwise spring 81, a clockwise spring 82, and a spring seat 83. Further, as illustrated in FIG. 33, the spring structure 80 is assembled to a valve drive device for each of an exhaust valve 85 and an intake valve 86 of a cylinder head 84 of an engine. The exhaust valve 85 is arranged to be able to advance to/retreat from an exhaust port 84a through a valve guide 88a. The intake valve 86 is arranged to be able to advance to/retreat from an intake port 84b through a valve guide 88b.

Further, the spring structure 80 is arranged on each of the outer peripheral side of the exhaust valve 85 and the outer peripheral side of the intake valve 86. The lower end portion of the spring structure 80 is supported by a spring seat portion 87a/87b formed on a main body side of the cylinder head 84. The upper end portions of the spring structure 80 is fixed to each of the upper end portion of the exhaust valve 85 and the upper end portion of the intake valve 86. In this embodiment, the spring structure 80 is mounted such that the counterclockwise spring 81 is situated on the upper side of the spring structure and the clockwise spring 82 is situated on the lower side thereof. Further, the upper end portion of the exhaust valve 85 and the upper end portion of the intake valve 86 respectively receive, through a rocker arm 85b, 86b moving around a hydraulic lash adjuster 85a, 86a as a fulcrum, drive forces from an exhaust cam shaft 85c and an intake cam shaft 86c rotated by driving of a crank shaft (not shown). The drive forces drive the exhaust valve 85 and the intake valve 86.

Further, the intake valve 86 is opened during an intake process to send the air, which is supplied from an intake system (not shown) through the intake port 84b, into the cylinder head 84 of the engine, and is closed during an exhaust process. The exhaust valve 85 is opened during the exhaust process to send out an exhaust gas, which is emitted out of the cylinder, into an exhaust passage through the exhaust port 84a, and is closed during the intake stroke. During those operations, the spring structures 80 urge the exhaust valve 85 and the intake valve 86 upward, and cause upward and downward movements of the exhaust valve 85 and the intake valve 86 to follow rotations of the exhaust cam shaft 85c and the intake cam shaft 86c. Even in the spring structure 80, no force in the twisting direction is generated between the upper end portion and the lower end portion of the spring structure, and hence performance of the valve drive device can be improved. In this structure, the cylinder head 84 serves the base, and the exhaust valve 85 or the intake valve 86 serve the moving section.

Figure 34:
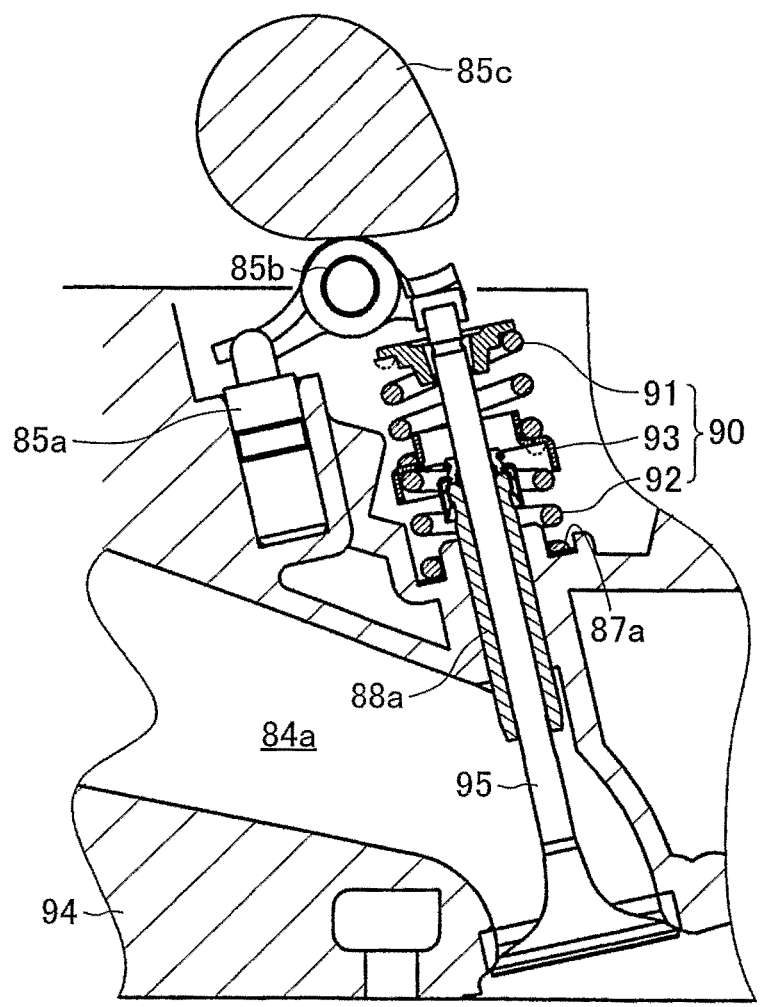
FIG. 34 is a sectional view illustrating a state in which a spring structure according to an eighth embodiment is assembled to the intake valve of the engine.

FIG. 34 illustrates a spring structure 90 according to an eighth embodiment of the present invention. The spring structure 90 has substantially the same configuration as that of the above-mentioned spring structure 40, and includes a counterclockwise spring 91, a clockwise spring 92, and a spring seat 93. Further, as illustrated in FIG. 34, the spring structure 90 is assembled to each of an exhaust valve 95 and an intake valve (not shown) of a cylinder head 94 of the engine. Also in this embodiment, similarly to the seventh embodiment, the counterclockwise spring 91 is situated in the upper part of the spring structure, and the clockwise spring 92 is situated in the lower part thereof. Other configurations of the spring structure 90 are the same as those of the above-mentioned spring structure 80. Therefore, the same components are denoted by the same reference symbols, and description thereof is omitted. Further, functions and effects of the spring structure 90 are also similar to the functions and effects of the above-mentioned spring structure 80. Note that, as another embodiment, a spring structure having the same configuration as that of the above-mentioned spring structure 20, 30a, 30b, 50, 50a, 60, or 70 may be assembled to the exhaust valve 95 or the intake valve of the engine 94.

Figure 35:
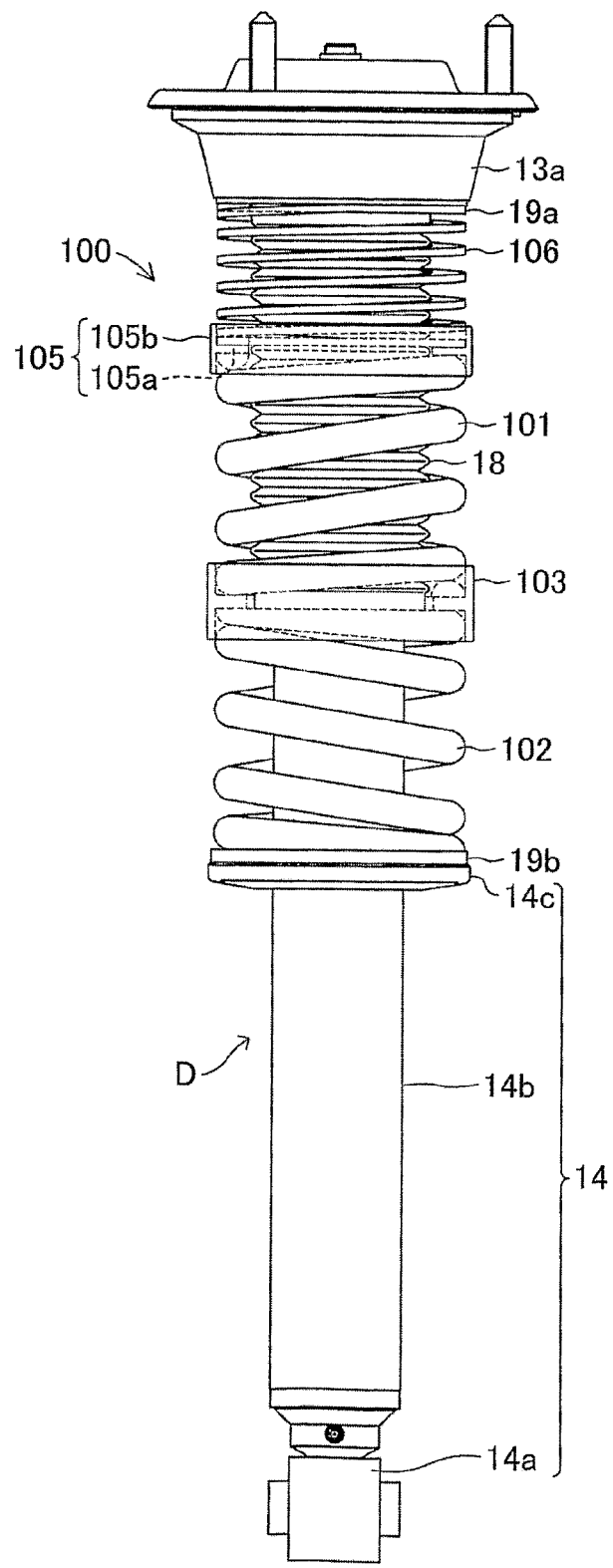
FIG. 35 is a front view of a spring structure according to a ninth embodiment.
Figure 36:
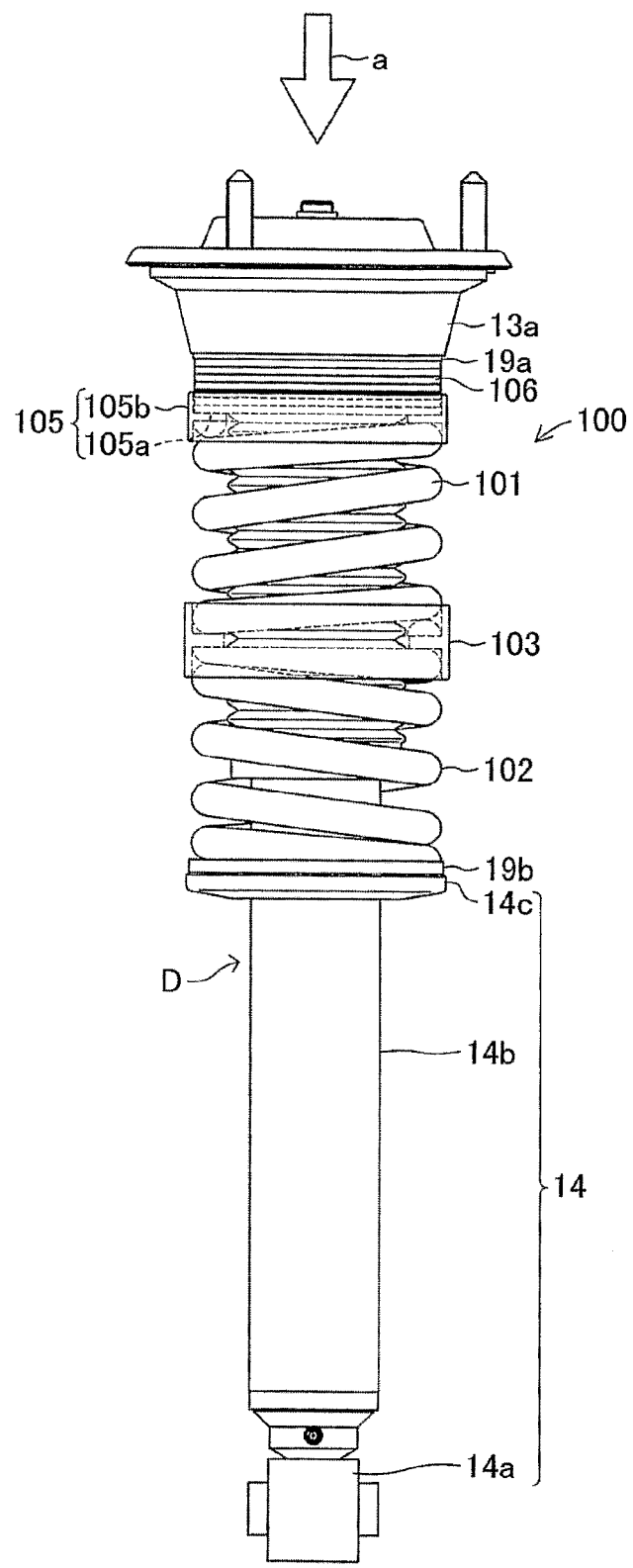
FIG. 36 is a front view illustrating a state in which the spring structure of FIG. 35 is contracted.

FIG. 35 and FIG. 36 illustrate a state in which a spring structure 100 according to a ninth embodiment of the present invention is assembled to the damper D for the suspension of the automobile. In the spring structure 100, a clockwise spring 101 and a counterclockwise spring 102 are respectively reduced in length relative to the clockwise spring 21 and the counterclockwise spring 22 of the spring structure 20. Further, a well-known auxiliary spring (helper spring) 106 is arranged above the clockwise spring 101 through an intermediate seat 105. The auxiliary spring 106 is provided to prevent clearance from causing between the clockwise spring 101 and the counterclockwise spring 102 at the time of maximum expansion, and to ensure rebump stroke. The auxiliary spring 106 is constituted by a spring having a spring constant lower than that of the clockwise spring 101 and the counterclockwise spring 102. Further, the auxiliary spring 106 is formed into a spiral shape obtained by coiling a plate with a small width. When the automobile is stopped, the auxiliary spring 106 shrinks to have a cylindrical shape with no clearance as illustrated in FIG. 36.

A spring seat 103 arranged between the clockwise spring 101 and the counterclockwise spring 102 is configured substantially in the same manner as the above-mentioned spring seat 23. Further, the intermediate seat 105 has substantially the same configuration as that of the spring seat 103, and is formed into such a shape that a cylindrical tubular portion 105b is coupled onto an outer periphery of an annular abutting plate portion 105a. A length in the up-and-down direction of the tubular portion 105b is slightly smaller than a length in the up-and-down direction of a tubular portion 103b of the spring seat 103. Other configurations of the spring structure 100 are the same as those of the above-mentioned spring structure 20. Therefore, the same components are denoted by the same reference symbols, and description thereof is omitted.

As indicated by an arrow "a" of FIG. 36, when a force for shrinking the spring structure 100 is applied to the spring structure 100, the auxiliary spring 106 first shrinks to become a cylindrical shape with no clearance between its portions, and then the clockwise spring 101 and the counterclockwise spring 102 shrink. Further, when the force for shrinking the spring structure 100 is removed, the clockwise spring 101 and the counterclockwise spring 102 first expand to return to original states, and then the auxiliary spring 106 expands to return to an original state. In this embodiment, in the state illustrated in FIG. 35, the auxiliary spring 106 prevents clearance from causing between the clockwise spring 101 and the counterclockwise spring 102. Other functions and effects of the spring structure 100 are the same as those of the above-mentioned spring structure 20. Also in this case, a portion of each of the springs 101, 102, on which the spring seat 103 abuts, may be polished to increase a flat surface portion, and both of the springs 101, 102 may be bonded to the spring seat 103.

Figure 37:
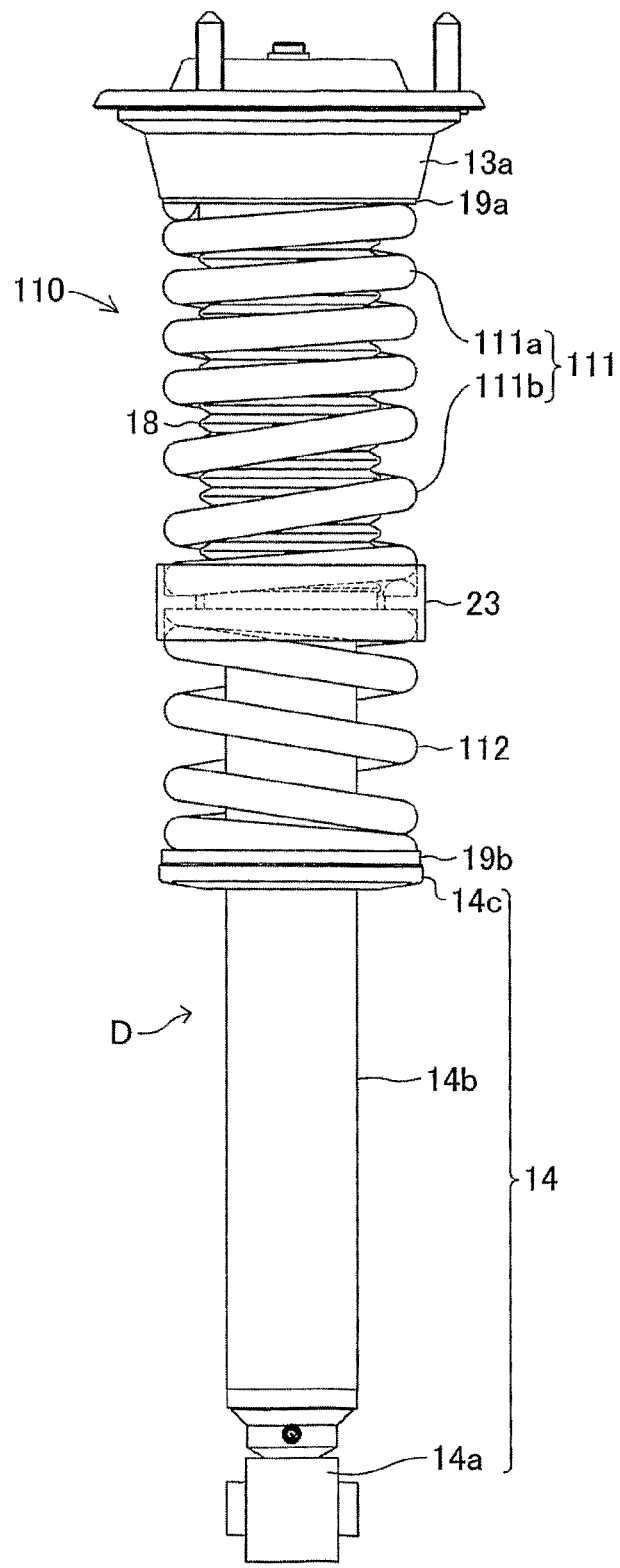
FIG. 37 is a front view of a spring structure according to a tenth embodiment.
Figure 38:
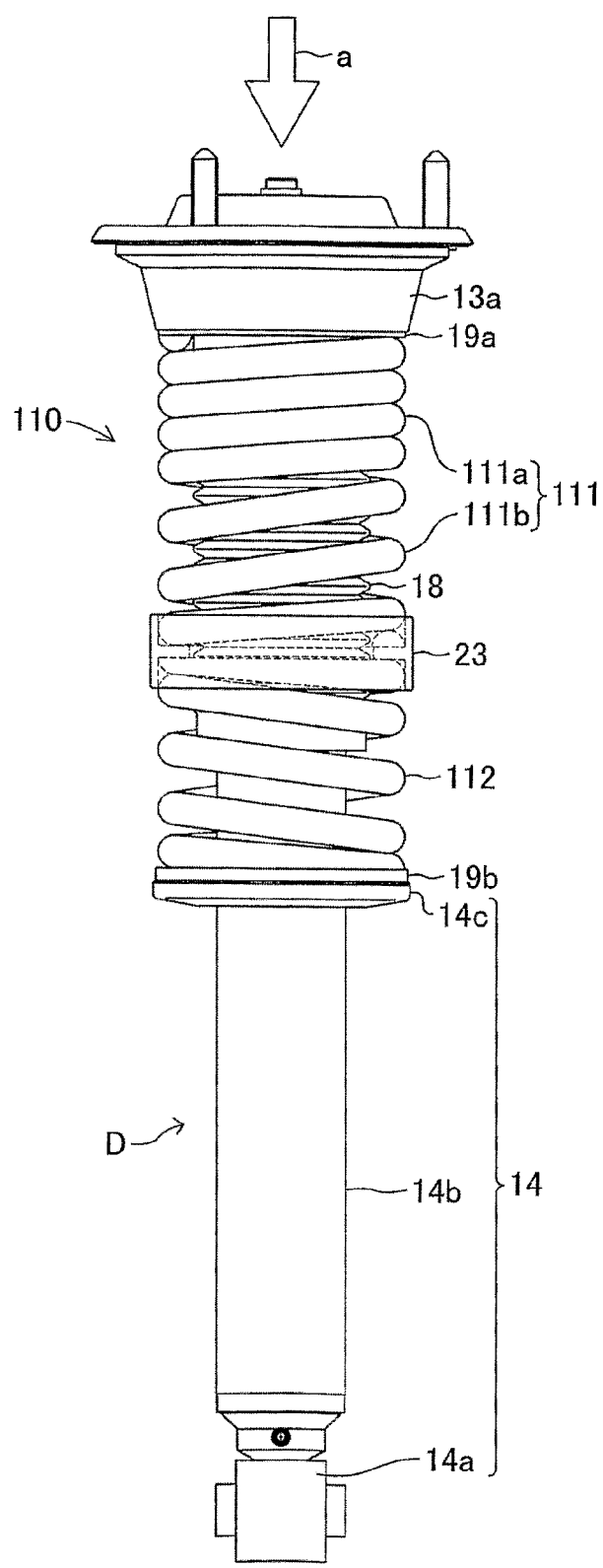
FIG. 38 is a front view illustrating a state in which the spring structure of FIG. 37 is contracted.

FIG. 37 and FIG. 38 illustrate a spring structure 110 according to a tenth embodiment of the present invention. Similarly to the above-mentioned ninth embodiment, the spring structure 110 is used for the suspension of the automobile. In the spring structure 110, a clockwise spring 111 employs a variable rate spring including a low spring constant portion 111a in its upper part and a high spring constant portion 111b in its lower part. Further, an axial length of the clockwise spring 111 is larger than an axial length of a counterclockwise spring 112. Further, a spring constant of the counterclockwise spring 112 is equal to a spring constant of the high spring constant portion 111b of the clockwise spring 111. The low spring constant portion 111a of the clockwise spring 111 is provided to achieve an object similar to the object for the above-mentioned auxiliary spring 106. Other configurations of the spring structure 110 are the same as those of the above-mentioned spring structure 20. Therefore, the same components are denoted by the same reference symbols, and description thereof is omitted.

As indicated by an arrow "a" of FIG. 38, when a force for shrinking the spring structure 110 is applied to the spring structure 110, the low spring constant portion 111a of the clockwise spring 111 first shrinks to become a cylindrical shape with no clearance between its portions, and then the high spring constant portion 111b of the clockwise spring 111 and the counterclockwise spring 112 shrink. Also in this embodiment, when the spring structure 110 is mounted to the vehicle body 11 of the automobile, the low spring constant portion 111a of the clockwise spring 111 shrinks to become a cylindrical shape with no clearance when the automobile is stopped.

Further, when the force for shrinking the spring structure 110 is released, the high spring constant portion 111b of the clockwise spring 111 and the counterclockwise spring 112 first expand to return to original states, and then the low spring constant portion 111a of the clockwise spring 111 expands to return to an original state. Also in this embodiment, in the state illustrated in FIG. 37, the low spring constant portion 111a of the clockwise spring 111 prevents clearance from causing between the high spring constant portion 111b of the clockwise spring 111 and the counterclockwise spring 112. Further, when the spring structure 110 returns from the shrink state to the original state, the low spring constant portion 111a of the clockwise spring 111 ensures the stroke required when the high spring constant portion 111b of the clockwise spring 111 and the counterclockwise spring 112 expand to return to the original states. Other functions and effects of the spring structure 110 are the same as those of the above-mentioned spring structure 20. Also in this case, a portion of each of the springs 111, 112, on which the spring seat 23 abuts, may be polished to increase a flat surface portion, and both of the springs 111, 112 may be bonded to the spring seat 23.

The spring structure according to the present invention is not limited to the above-mentioned embodiments, and can be modified as needed for implementation. For example, in each of the above-mentioned embodiments, the coaxially holding portion of the spring seat 23 or the like is constituted by the cylindrical tubular portion 23b or the like. However, the coaxially holding portion may be constituted by a plurality of projections, etc. Further, in a structure where the damper D or the like is not arranged inside the spring structure, the abutting plate portion of the spring seat 23 or the like may be constituted by a circular plate portion or the like instead of the annular plate portion. In addition, the spring structure according to the present invention is not limited to use for a vehicle such as an automobile or an engine, and may be used for a product provided with such a mechanism that a moving section advances to/retreats from a base.

Further, in the above-mentioned embodiments, the clockwise spring 21 or the like and the counterclockwise spring 22 or the like are arranged such that the start points of the effective winding, which corresponds to each other, of the clockwise spring 21 or the like and the counterclockwise spring 22 or the like are shifted by 180 degrees in the circumferential direction around the axis of the spring. However, the shift degrees is not limited to 180 degrees, and it is only necessary to prevent the boundary portion between the clockwise spring 21 or the like and the counterclockwise spring 22 or the like from being displaced together with the spring seat 23 or the like in the direction orthogonal to the axial direction, and to maintain the clockwise spring 21 or the like and the counterclockwise spring 22 or the like in a substantially straight state as a whole. For example, it is preferred that the shift degrees be set within a range of 180±45 degrees.

Figure 39:
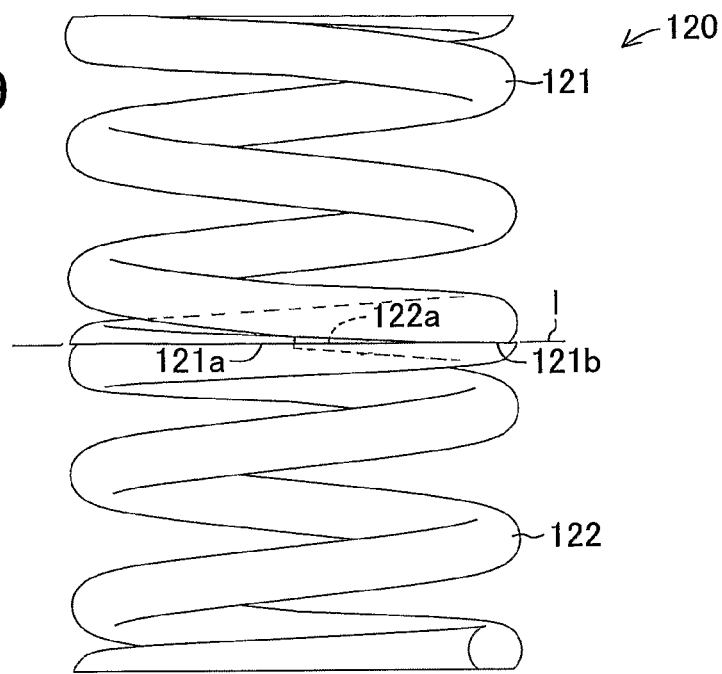
FIG. 39 is a front view of a main part of a spring structure according to Reference Example.
Figure 40:
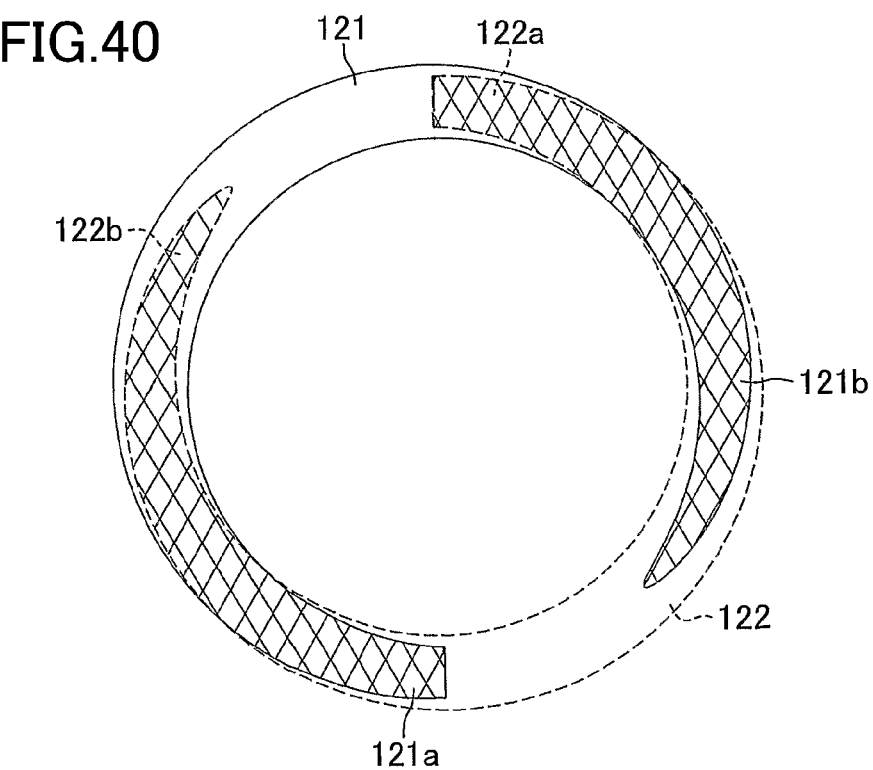
FIG. 40 is an explanatory diagram of a joint portion between the counterclockwise spring and the clockwise spring illustrated in FIG. 39.

Further, a spring structure 120 illustrated in FIG. 39 as Reference Example may be used. The spring structure 120 includes only a counterclockwise spring 121 and a clockwise spring 122, and does not include a spring seat. As further illustrated in FIG. 40, the counterclockwise spring 121 has bonding surfaces 121a, 121b formed on the lower end surface thereof polished into a flat surface, and the clockwise spring 122 has bonding surfaces 122a, 122b formed on the upper end surface thereof polished into a flat surface. The counterclockwise spring 121 and the clockwise spring 122 are bonded to each other with an adhesive such that the bonding surface 121a and the bonding surface 122b overlap each other, and the bonding surface 121b and the bonding surface 122a overlap each other. The line 1 of FIG. 39 indicates a position of a joint surface between the counterclockwise spring 121 and the clockwise spring 122. In FIG. 40, a part indicated by solid lines constitutes the lower end surface of the counterclockwise spring 121, and a part indicated by broken lines constitutes the upper end surface of the clockwise spring 122. According to the spring structure 120, it is possible to omit the spring seat, and hence it is possible to simplify the structure and to reduce cost.

The invention claimed is:

1. A spring structure, which is mounted between a base and a moving section that advances to and retreats from the base, comprising:

two compression coil springs including a first compression coil spring having a first winding direction and a second compression coil spring having a second winding direction, the first winding direction being different from the second winding direction; wherein:

a first end portion of the first compression coil spring is supported on the base directly or through a first predetermined member, and a first end portion of the second compression coil spring is supported on the moving section directly or through a second predetermined member;

a second end portion of the first compression coil spring is supported on a front surface of a spring seat, and a second end portion of the second compression coil spring is supported on a second surface of the spring seat;

the spring seat is interposed between the second end portions so that both the second end portion of the first compression coil spring and the second end portion of the second compression coil spring shift in position, relative to start points of effective windings of the two compression coil springs or end portions of element wires of the two compression coil springs, from each other in a circumferential direction around an axis of the two compression coil springs;

the two compression coil springs are coaxially arranged through the spring seat; and the spring seat is movable in an axial direction of the two compression coil springs and in the circumferential direction around the axis of the two compression coil springs; and the spring seat rotates in the circumferential direction around the axis of the two compression coil springs together with the second end portions of the two compression coil springs when the two compression coil springs expand and shrink.

2. The spring structure according to claim 1, wherein, the shift in the circumferential direction around the axis of the two compression coil springs, between the second end portions of the two compression coil springs abutting on the spring seat, is set within a range of 180±45 degrees relative to the start points of the effective windings or the end portions of the element wires.

3. The spring structure according to claim 1, wherein the front and back surfaces of the spring seat, on which the second end portions of the two compression coil springs abut, are formed into flat surfaces, and the second end portions of the two compression coil springs which abut on the spring seat are formed into flat surfaces orthogonal to the axis of the two compression coil springs.

4. The spring structure according to claim 1, wherein the spring seat comprises:

an abutting plate portion on which the second end portions of the two compression coil springs abut; and a coaxially holding portion, which coaxially holds the two compression coil springs, provided to both front and back surfaces of the abutting plate portion.

5. The spring structure according to claim 1, wherein the front and back surfaces of the spring seat, on which the second end portions of the two compression coil springs are disposed, have engaging protrusions formed thereon which allow the end portions of the element wires of the two compression coil springs to abut to the engaging protrusions.

6. The spring structure according to claim 1, wherein the second end portions of the two compression coil springs abutting on the spring seat are provided with engaged recesses, and the both front and back surfaces of the spring seat, on which the second end portions of the two compression coil springs abut, have engaging protrusions formed thereon which allow the engaged recesses of the two compression coil springs to be engaged to engaging protrusions.

7. The spring structure according to claim 1, wherein the second end portions of the two compression coil springs abutting on the spring seat have shapes made just by cutting, and the front and back surfaces of the spring seat, on which the end portions of the two compression coil springs abut, have engagement recesses formed thereon which allow the end portions of the element wires of the two compression coil springs to be engaged to the engagement recesses.

8. The spring structure according to claim 7, wherein portions of the spring seat on which the second end portions of the two compression coil springs abut are respectively provided with recesses shifted in position in the circumferential direction, and the second end portions of the two compression coil springs abutting on the spring seat are positioned in the recesses, respectively.

9. The spring structure according to claim 1, wherein the two compression coil springs different in the winding directions comprise compression coil springs having different diameters.

10. The spring structure according to claim 1, wherein the two compression coil springs different in the winding directions comprise compression coil springs having different diameters, and the portions of the spring seat on which the second end portions of the two compression coil springs abut are formed into such shape that the portions of the spring seat are positioned on different levels in the axial direction so that the two compression coil springs partially overlap each other in the axial direction.

11. The spring structure according to claim 1, wherein the two compression coil springs different in the winding directions are substantially same in characteristic shown when the two compression coil springs shrink and define a torsion angle in a rotating direction with respect to a displacement amount of the spring.

12. The spring structure according to claim 1, wherein a telescopic shaft includes an inner shaft portion which includes a spring seat portion on an outer peripheral portion of the inner shaft portion, and an outer shaft portion which includes a spring seat portion on an outer peripheral portion of the outer shaft portion and is assembled to the inner shaft portion to be movable in the axial direction, and one of the inner shaft portion and the outer shaft portion of the telescopic shaft serves as the base, and the other one of the inner shaft portion and the outer shaft portion serves as the moving section so that the spring structure is disposed between the spring seat portions on the outer periphery of the telescopic shaft.

13. The spring structure according to claim 12, wherein an insertion hole is formed in a center of the spring seat, and the telescopic shaft passes through the insertion hole of the spring seat.

\* \* \* \* \*